US012795299B2

(12) United States Patent
Mamidwar et al.

(10) Patent No.: US 12,795,299 B2
(45) Date of Patent: Nov. 10, 2026

(54) SYSTEMS AND METHODS FOR LATENCY IMPROVEMENT FOR WIRELESS SPEAKERS

(71) Applicant: Avago Technologies International Sales Pte. Limited, Singapore (SG)

(72) Inventors: Rajesh Shankarrao Mamidwar, San Diego, CA (US); Prashant Katre, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 136 days.

(21) Appl. No.: 18/651,362

(22) Filed: Apr. 30, 2024

(65) Prior Publication Data

US 2025/0338066 A1 Oct. 30, 2025

(51) Int. Cl.
*H04R 5/04* (2006.01)
*H04R 3/12* (2006.01)
*H04L 65/60* (2022.01)

(52) U.S. Cl.
CPC ................. *H04R 5/04* (2013.01); *H04R 3/12* (2013.01); *H04L 65/60* (2013.01); *H04R 2420/07* (2013.01)

(58) Field of Classification Search
CPC ......... H04R 2420/07; H04R 3/12; H04R 5/04
See application file for complete search history.

(56) References Cited

U.S. PATENT DOCUMENTS 9,167,296 B2 * 10/2015 Wang ............... H04N 21/43637
9,351,154 B1 * 5/2016 Steve ...................... H04W 4/80
10,218,312 B2 * 2/2019 Cope ..................... H03F 3/2173
10,649,948 B2 * 5/2020 Kessler .................... G06F 1/266
11,558,707 B2 * 1/2023 Schevciw ............... G06F 3/165
11,595,316 B2 * 2/2023 Kumar ..................... H04L 47/25
11,874,791 B2 * 1/2024 Kessler .............. G05B 19/0423
12,041,110 B2 * 7/2024 Zhu ................... H04M 1/72442
12,095,952 B2 * 9/2024 Sekar .................... H04M 9/082
12,120,622 B2 * 10/2024 Strøm ................... H04J 3/0632
12,634,546 B2 * 5/2026 Zhang ................ H04N 21/4307
2020/0162528 A1 * 5/2020 Duthaler ............. G06F 9/44526

OTHER PUBLICATIONS

Kim et al. "An Improvement of Audio Transfer QoS over 802.11 WiFi Network Environment", IEEE ISCE 2014, pp. 1-2.
Mourjopoulos et al. "Limitations of All-Digital Networked Wireless, adaptive Audio Systems", AES 30th International Conference, Mar. 15-17, 2007, pp. 1 to 18.
Partial European Search Report on Appln. No. EP 25172937.2 dated Oct. 1, 2025.

* cited by examiner

*Primary Examiner* — Disler Paul
(74) *Attorney, Agent, or Firm* — Foley & Lardner LLP

(57) ABSTRACT

The disclosure describes systems and methods for improving latency for wireless speakers. The system can establish a buffer pipe between a wireless chip of a media player and a wireless chip of a wireless speaker using an inter-IC sound protocol. The system can receive samples of audio data through the media player. The system can communicate the audio data to the wireless speaker using the buffer pipe to bypass the transport layer stack of the media player and the wireless speaker. The system can cause a transmitter of the wireless speaker to provide the audio data to a digital audio converter for output to a speaker of the wireless speaker.

20 Claims, 11 Drawing Sheets

SYSTEMS AND METHODS FOR LATENCY IMPROVEMENT FOR WIRELESS SPEAKERS

FIELD OF THE DISCLOSURE

This disclosure generally relates to systems and methods for synchronizing network-based playback of content, including, without limitation, improving latency in wireless speaker systems.

BACKGROUND

The quality of the user experience when consuming multimedia content relies on the synchronization of audio and video. Any deviation from alignment, even by milliseconds, can disrupt the viewing experience and detract from enjoyment. In wireless entertainment systems, during content playback, the audio transmitted to wireless speakers via a wireless medium should be synchronized with the corresponding video of the content being played.

SUMMARY

During the playback of multimedia content such as TV shows, movies, and music, the wireless entertainment system can transmit audio data wirelessly from the source (e.g., a media player) to wireless speakers. The wireless entertainment system can experience delays due to network latency, where transmission delays can vary based on network conditions, including, but not limited to, congestion, bandwidth limitations, or interference. Additionally, the wireless entertainment system can experience processing delays as both the source device and wireless speakers need time to process the audio data, adding to the total delay. The choice of wireless transmission technology, including Bluetooth and Wi-Fi, can have latency characteristics that affect synchronization. The placement of speakers relative to the source can introduce a fixed delay that requires compensation. These variable delays can disrupt the balance between audio and video, leading to issues such as audio lagging behind video, creating a disconnect between visual and auditory cues, or causing audio artifacts such as echo or distortion that further disrupt the listening experience.

The technical solutions disclosed herein overcome these challenges by establishing a buffer pipe directly between the media player and wireless speaker, bypassing network protocols, such as the transport layer stack. The technical solution reduces latency by avoiding unnecessary processing steps. The buffer pipe can use a protocol configure for audio data transfer between digital audio devices. As a result, the technical solution of the present disclosure reduces latency of audio communications for wireless speakers.

At least one aspect of the technical solutions is directed to a method of improving latency for wireless speakers. The method can include establishing a buffer pipe between a first wireless chip of a media player and a second wireless chip of a wireless speaker using an Inter-IC Sound (I2S) protocol, with the wireless speaker in wireless communication with the media player. The method can include receiving, by a receiver of the first wireless chip of the media player, samples of audio data. The method can include communicating, by the first wireless chip, the audio data to the second wireless chip using the buffer pipe to bypass a transport layer stack of the media player and the wireless speaker. A transmitter of the second wireless chip can provide the audio data directly to a digital audio converter for output to a speaker of the wireless speaker.

The method can include communicating pulse code modulation (PCM) audio data from the first wireless chip to the second wireless chip via the I2S protocol. The method can include the first wireless chip communicating the audio data to the second wireless chip via a machine access control (MAC) layer of a network stack. The method can include communicating the audio data by the first wireless chip to the second wireless chip via a buffer copy of the audio data from a first buffer of the first wireless chip to a second buffer of the second wireless chip. The wireless speaker can be in communication with the media player via an access point. The media player can include at least one of a set-top box, a television, a home theater system, or an over-the-top (OTT) device.

The method can include receiving, by the receiver, samples of audio data from output of an audio processor of the media player. The receiver can include an I2S receiver. The method can include receiving, by the transmitter, the audio data from a buffer of the second wireless chip. The transmitter can include an I2S transmitter.

At least one aspect of the technical solutions is directed to a system. The system can include one or more processors coupled with memory. The one or more processors can be configured to include a first wireless chip of a media player in wireless communication with a second wireless chip of a wireless speaker. The first wireless chip and the second wireless chip can be configured to establish a buffer pipe to transfer audio data using an Inter-IC Sound (I2S) protocol. An I2S receiver of the first wireless chip of the media player can be configured to receive samples of audio data. The one or more processors can be configured to communicate the audio data to the second wireless chip using the buffer pipe to bypass a transport layer stack of the media player and the wireless speaker. An I2S transmitter of the second wireless chip can provide the audio data directly to a digital audio converter for output to a speaker of the wireless speaker.

In some embodiments, the I2S receiver can be further configured to communicate pulse code modulation (PCM) audio data from the first wireless chip to the second wireless chip via the Inter-IC Sound (I2S) protocol. In some embodiments, the first wireless chip can be further configured to communicate the audio data to the second wireless chip via a machine access control (MAC) layer of a network stack. In some embodiments, the first wireless chip can be further configured to communicate the audio data to the second wireless chip via a buffer copy of the audio data from a first buffer of the first wireless chip to a second buffer of the second wireless chip. In some embodiments, the media player can include at least one of a set-top box, a television, a home theater system, or an over-the-top (OTT) device. In some embodiments, the I2S receiver can be further configured to receive the samples of audio data from output of an audio processor of the media player.

At least one aspect of the technical solutions is directed to a method of providing audio streaming. The method can include identifying a media player and a wireless speaker for which to provide a low latency data pipe through an access point. The access point can provide wireless connectivity between the media player and the wireless speaker. The method can include establishing a constant bit rate pipe between the media player and the access point. The method can include establishing a high priority data pipe between the access point and the wireless speaker. The method can include communicating pulse code modulation (PCM) audio data from the media player through the constant bit rate pipe to the access point and through the high priority data pipe to the wireless speaker.

The method can include disabling aggregation of data by at least one of the media player, the access point, or the wireless speaker. The method can include establishing a wireless link from the media player to the wireless speaker, bypassing any other mesh nodes on a network of the access point. The access point can maintain a high priority queue for audio data from the media player to be communicated via the high priority data pipe to the wireless speaker. The method can include communicating audio data uncompressed. The media player can include at least one of a set-top box, a television, a home theater system, or an over the top (OTT) device.

At least one aspect of the technical solutions is directed to a system. The system can include one or more processors coupled with memory. The one or more processors can be configured to identify a media player and a wireless speaker for which to provide a low latency data pipe through an access point. The access point can provide wireless connectivity between the media player and the wireless speaker. The one or more processors can be configured to establish a constant bit rate pipe between the media player and the access point. The one or more processors can be configured to establish a high priority data pipe between the access point and the wireless speaker. The one or more processors can be configured to communicate pulse code modulation (PCM) audio data from the media player through the constant bit rate pipe to the access point and through the high priority data pipe to the wireless speaker.

The one or more processors can be configured to disable aggregation of data by at least one of the media player, the access point, or the wireless speaker. The one or more processors can be configured to establish a wireless link from the media player to the wireless speaker, bypassing any other mesh nodes on a network of the access point. The access point can maintain a high priority queue for audio data from the media player to be communicated via the high priority data pipe to the wireless speaker. The one or more processors can be configured to communicate audio data uncompressed. The media player can include at least one of a set-top box, a television, a home theater system, or an over the top (OTT) device.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
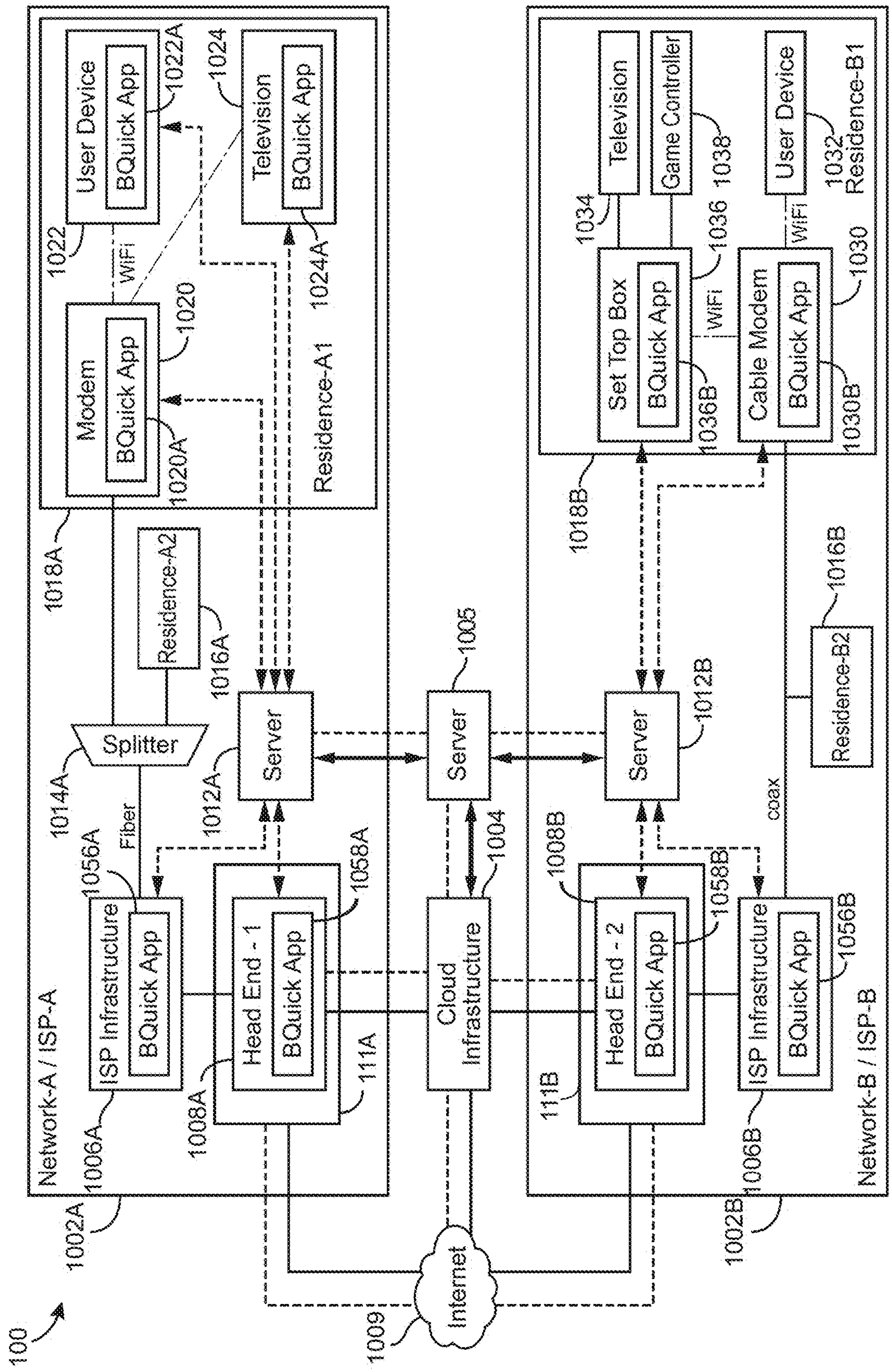
FIG. 1A illustrates a general schematic block diagram of a communication system, in accordance with one or more embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

The following IEEE standard(s), including any draft versions of such standard(s), are hereby incorporated herein by reference in their entirety and are made part of the present disclosure for all purposes: IEEE 802.11™, IEEE 802.14™, IEEE P802.3™ and IEEE Ethernet standard systems including but not limited to LRM, VSR, SR, MR, LR, ZR and KR. Although this disclosure may reference aspects of these standard(s), the disclosure is in no way limited by these standard(s).

Devices provided by ISPs and customer-owned AR/VR setups, mobile phones, OTT devices, and cloud gaming clients are configured for low latency uses in some embodiments. Some embodiments of systems and methods disclosed herein provide a real time or near real time system to monitor end to end latencies. In some applications, timestamp synchronization with applications at intermediate nodes and end devices use precision time protocol (PTP)

synchronization protocols for latency monitoring. In some embodiments, latency is monitored from end-to-end so that latency of all devices within the entire end-to-end process is considered, thereby enabling identification of the origins of substantial latency.

In some embodiments, the systems and methods achieve synchronization of the wall clock across all nodes and end-user devices by employing timestamps for low latency data packets at each node. The determination of latency at each node is made by applications at each node. The determination of latency is reported back to a server that communicates with the applications. The systems and methods allow the communication system to distinguish whether latency arises from the home network, an ISP, or cloud servers.

A latency application server extension is integrated into the ISP-provided modem or router in some embodiments. In some embodiments, the server extensions have the ability to filter and transmit all necessary information to the ISP's cloud server or share open data with application developers. The server extension can store or receive information about a customer's low latency plan subscription and can track low latency usages inside the home in some embodiments.

A server extension can refer to a software component or module that extends the functionality of a server application (e.g., a latency application) in some embodiments. Server extensions can be used in various server environments such as web servers, application servers, ISP servers, and database servers to enhance their capabilities or to add specific features tailored to the needs of users or applications and can be installed using extension files. The extensions can be installed on any of the devices discussed herein. In some embodiments, the extensions are provided on an ISP controlled server in the cloud, an ISP controlled modem or access point, a third party WiFi access point, a third party modem, or ISP provided low latency devices.

In some embodiments, the server extension allows a user to select device applications for different latency treatment. A server within the residence can use classifiers and queues to reduce latency for low latency devices. The server can be part of a router, set top box, hub, etc. in some embodiments. The server extensions support multiparty involvement (e.g., cloud managers, ISPs, application developers and silicon vendors) for end to end usages in some embodiments.

With respect to latency, generally, latency refers to an amount of time a system, application or device takes to process and respond to a request in some embodiments. With respect to low latency, low latency refers to such amount of time being within a threshold, a performance level, a user experience level or requirements of the application or usage in some embodiments. The threshold, performance level, user experience level or requirements of the application may vary based on context, such as a type of application and/or use case and the systems, networks, and computer environment for which such use cases and/or application operate or execute. Low latency from a perspective of a computing environment refers to an ability of a computing system or network to provide responses without unacceptable or unsuitable delay, or otherwise minimal delay, for the context or use case of which such responses are provided. System criteria and application parameters can affect a threshold for low latency. The threshold can be fixed or variable (e.g., depending upon conditions or actual needs or requirements at a particular time). With respect to low latency networks and systems in a context of network and network communication, low latency describes a computer network, systems and environment that is designed, configured and/or implemented to support applications, network traffic and processing operations to reduce, improve latency or to meet a low latency threshold. End-to-end latency refers to latency between two points in a network or communication system. The two points can be a source of data and a consumer of data, or intermediate points therebetween in some embodiments.

A low latency device refers to any hardware, device component, or system that has low latency considerations or requirements in some embodiments. A low latency device can be a telecommunications, remote control systems, gaming, audio processing, financial trading, augmented reality and/or virtual reality device where delays can impact user experience or system performance. There may be levels of low latency requirements where one low latency device has a more stringent requirement than another low latency device in some embodiments. A low latency path refers to a path for low latency operation in some embodiments. Latency data refers to any indication of latency associated with a communication or configuration data for low latency operation or control in some embodiments. A low latency application refers to the use or performance of a low latency operation in some embodiments. A low latency device or software program can be used to perform the low latency operation (video conferencing, cloud gaming, augmented reality/virtual reality (AR/VR) applications, and metaverse applications).

Some embodiments relate to a system including a first device and an application. The application operates on the first device and is configured to append time stamps to a first packet received by the first device. The time stamps indicate a first time the first packet is received by the first device and a second time the first packet is sent by the first device. Append refers to adding or attaching information to a data structure (e.g., a packet) in some embodiments.

In some embodiments, the application is configured to determine latency information associated with communication through the first device using the time stamps. The time stamps include a first time stamp for the first time and a second time stamp for the second time. In some embodiments, the application is configured to provide a second packet including the latency information and communicate the second packet to a server remote from the first device via a virtual communication link. In some embodiments, the first time stamp is an ingress time stamp and the second time stamp is an egress time stamp.

In some embodiments, the time stamps are provided as part of a precision time protocol. In some embodiments, the first packet is for use in a low latency operation. In some embodiments, the time stamps are derived from a satellite time source. In some embodiments, the latency information includes a history of time stamps. In some embodiments, the first device is a user device, cloud infrastructure, internet service provider infrastructure, a set top box, a cable modem, or a wireless router.

Some embodiments relate to a non-transitory computer readable medium having instructions stored thereon that, when executed by a processor, cause a processor to receive a first packet from a first node. The first packet includes latency information associated with a second packet provided to the first node for a low latency application. The instructions also cause the processor to provide a third packet to the first node or other nodes to increase priority for packets for the low latency application if the latency information indicates that a latency threshold for the low latency application has not been met. The first node can be part of a communication system including a cable, fiber optic, or wireless network. The other nodes and the first node are in path associated with the second packet provided to the first node for the low latency application.

In some embodiments, the processor is disposed on a server remote from the first node. In some embodiments, the server is in communication with internet service provider infrastructure and the third packet is provided to the internet service provider infrastructure. In some embodiments, the third packet is provided to internet service provider infrastructure, a set top box, a cable modem, or a wireless router.

In some embodiments, the instructions cause the processor to provide a fourth packet to the first node or the other nodes to decrease priority for packets for the low latency application if the latency information indicates that the latency threshold for the low latency application has been met and additional bandwidth is available.

In some embodiments, the latency information comprises a user identification.

Some embodiments relate to a method of providing low latency service. The method includes providing a first time stamp for a first packet provided to a first device. The first packet can be for reception by a low latency device or as being for use in a low latency operation. The method also includes providing a second packet including latency information to a server remote from the first device via a virtual communication link.

In some embodiments, the method also includes providing a second time stamp for the first packet provided to the first device. In some embodiments, the first time stamp is an ingress time stamp and the second time stamp is an egress time stamp. In some embodiments, the first device includes an application configured to append the first time stamp to the first packet.

Some embodiments relate to a server. The server includes a first application configured to monitor end-to-end latency for a network. The network includes devices. The application is configured to receive latency information from at least one of the devices. The latency information includes time stamps or time period data for a packet to communicated across a device or a link. Monitoring or monitor refers to an action where performance is observed, checked, and/or recorded and can generally occur over a period of time.

A non-transitory computer readable medium have instructions stored thereon that, when executed by a processor, cause the processor to receive a first packet from a first node. The first packet includes latency information associated with a second packet provided to the first node for a low latency application. The instructions also cause the processor to provide a subscription offer in response to the latency information. The first node is part of a communication system comprising a cable, fiber optic, or wireless network. The other nodes and the first node are in path associated with the second packet provided to the first node for the low latency application.

In some embodiments, the first device is a set top box, a cable modem, or a wireless router. A device can refer to any apparatus, system, or component for performing an operation in some embodiments. A low latency device can refer to any device capable of performing a low latency operation. A low latency operation refers to an operation where higher than low latency operation can affect performance level, user experience level or a requirement of the application or use in some embodiments. A packet refers to a unit of data that is transmitted over a network in some embodiments. The packet can include a header and a payload. Time stamps and latency information can be appended to a packet in some embodiments. Classify or classifying may refer to any operation for determining a classification, grouping or arrangement in some embodiments. For example, a packet can be classified as being for a low latency device or application by reviewing an address, appended data, by its type of data, or other information in some embodiments. Bandwidth may refer to an amount of capacity for communication in some embodiments. Priority refers to a precedence, hierarchical order, level, or other classification in some embodiments. For example, packets can be ordered for transmission in accordance with a priority associated with a latency requirement in some embodiments. A cable, fiber optic, or wireless network refers to any network that uses one or more of a fiber optic cable, a coaxial cable, an ethernet cable, other wire, or wireless medium in some some embodiments.

For purposes of reading the description of the various embodiments below, the following descriptions of the sections of the specification and their respective contents may be helpful:

Section A describes a communication system that may be useful for practicing the embodiments described herein.

Section B describes low latency applications that may be useful for practicing the embodiments described herein.

Section C describes embodiments of network environments and computing environments that may be useful for practicing the embodiments described herein.

Section D describes embodiments of systems and methods of improving latency for wireless speakers.

A. Communication System

Network latency can significantly impact internet connectivity, user experience, and the performance of various online applications and services. Some embodiments provide information for ISPs to address end-to-end latency issues through network optimization, infrastructure upgrades, and efficient routing to ensure a reliable and responsive internet experience for their customers. In some embodiments, tools are provided so that cloud servers of ISPs can collect analytics data and can re-configure ISP provided devices like cable modems, GPON modems or set top boxes. In some embodiments, the systems and methods allow multiple parties (e.g., more than one ISP, cloud service providers, public switch operators, and application developers) to address low latency usages including but not limited to video conferencing, augmented reality (AR)/virtual reality (VR), and metaverse end to end usage. In some embodiments, the systems and methods allow multiple parties to cooperate and work together to address latency issues. In some embodiments, the systems and methods can be used with WiFi networks, Ethernet networks, modems, access network, backbone networks, IXPs, and cloud infrastructure and allow multiple teams to work together for latency optimizations across various mediums.

In some embodiments, a latency monitor measures and reports latency for each link, device, and end application. The reports are provided to controllers of the paths, such as, ISPs, application developers, end users, etc. so that actions can be taken once low latency requirements are not met. In some embodiments, systems and methods provide a seamless latency monitoring, analysis, and optimization. The analysis of latency measurements and reporting allows for identification of latency contributors in real time and optimization by mapping traffic requiring low latency traffic to low latency queues or paths. In some embodiments, devices in the path are provided with an application (e.g., software) for effecting monitoring, analysis, and optimization. The analysis of latency measurements and reporting allows for control of devices to appropriately provide low latency traffic to low latency queues or paths. The applications can be in communication with a latency server (e.g., a server for the applications) that coordinates operations and accumulates data according to the monitoring, analysis, and optimization operations. An application or app may refer to a software program or module configured to perform specific functions or tasks on an electronic device.

With reference FIG. 1A a communication system 100 includes a network 1002A for residences 1016A and 1018A, a network 1002B for residences 1016B and 1018B, a cloud infrastructure 1004, and a BQUICK_TOP server 1005. Communication system 100 advantageously is configured so that information is provided to ISPs to address latency issues through network optimization, infrastructure upgrades, service upgrades and/or efficient routing to ensure a reliable and responsive internet experience for customers can be achieved on networks 1002A and 1002B. BQUICK_TOP server 1005 is configured to receive the information and address latency issues in some embodiments. BQUICK_TOP server 1005 is in communication (e.g., via direct or virtual connections) with cloud infrastructure 1004 and networks 1002A and B (residences 1016A-B and 1018A-B) to share information, reports, commands, and other data in some embodiments. BQUICK_TOP server 1005, infrastructure 1004 and residences 1016A-B and 1018A-B can utilize any form of communication mediums, networks, protocols, etc. to communicate data and information.

Cloud infrastructure 1004 includes a collection of hardware, software, networking, and other resources that enable the delivery of cloud computing services over the internet in some embodiments. Cloud infrastructure 1004 includes physical servers, storage devices, networking equipment, and other hardware components hosted in data centers distributed across multiple geographic locations in some embodiments. The data centers are equipped with high-performance servers, storage arrays, and networking gear to support the computing needs of cloud services in some embodiments. The cloud infrastructure 1004 is configured to provide high-speed, redundant network links, routers, switches, and content delivery networks (CDNs) for delivery of low-latency, high-bandwidth content for users in some embodiments. Cloud infrastructure 1004 includes block storage (e.g., Amazon EBS, Azure Disk Storage), object storage (e.g., Amazon S3, Google Cloud Storage), and file storage (e.g., Amazon EFS, Azure Files) in some embodiments.

Residences 1016A and 1018A can include a network associated with a first ISP and residences 1016B and 1018B can include a network associate with the same ISP or a second ISP. In some embodiments, the networks for residences 1016A and 1018A and residences 1016B and 1018B are part of broadband access server (BAS) networks. Network 1002A includes infrastructure 1006A, a head end 1008A, a BQUICK ISP_A server 1012A, splitter 1014A, equipment for residence 1016A and equipment for residence 1018A. Equipment for residence 1018A includes an optical network unit (ONU) 1020, a user device 1022, and a television 1024. Modem or optical network unit 1020 can be a fiber optic router, switch, gateway etc. and have WiFi capabilities for a WiFi network associated with residence 1018A in some embodiments. Optical network unit 1020 is a GPON modem or optical network terminal (ONT) in some embodiments. GPON is a technology that allows for high-speed internet access over fiber optic cables. Optical network unit 1020 converts the optical signals transmitted over the fiber optic cables into electrical signals and/or radio frequency signals that can be used by devices in residence 1018A. Although system 100 is shown communicating via coaxial cable and optical cable, ground based wireless communications and satellite communications can be utilized in system 100. Optical network unit 1020 is generally provided by an optical network operator (ISP-A) and can be referred to as an optical network termination. BQUICK_TOP server 1005 and BQUICK ISP_A server 1012A can be Broadcom Analytics System (BAS Servers) that collect analytics data from various devices like modems, set top boxes, and other devices.

User device 1022 is a smart phone, AR/VR device, tablet, lap top computer, smart watch, exercise equipment, smart appliance, camera, headphone, automobile, other computing device, etc. Residence 1016A can have similar devices to residence 1018A. Television 1024 and user device 1022 communicate with optical network unit 1020 via a wireless network or wired connections. In some embodiments, optical network unit 1020 can include an ethernet router including wired connections to user device 1022, wireless modems, and television 1024.

Head end 1008A includes routers, switches, servers, and/or other infrastructure for communicating between ISP infrastructure 1006A and cloud infrastructure 1004. ISP infrastructure 1006A includes routers, switches, servers, and/or other infrastructure for communicating between head end 1008A and splitter 1014A. Splitter 1014A communicates via fiber optic cables between infrastructure 1006A and residences 1016A and 1018A. BQUICK ISP_A 1012A BQUICK_TOP server 1005 communicates with server 1012, infrastructure 1006A, head end 1008A and residences 1016A and 1018A via direct or indirect communication (e.g., via the Internet).

Splitter 1014A is a fiber optic splitter in some embodiments. Splitter 1014A can be used in fiber optic networks to divide an incoming optical signal into multiple separate signals for residences 1016A and 1018A and unify signals into one or more signals for infrastructure 1006A. Splitter 1014A can be configured for a passive optical network (PON) architecture. Bidirectional communication occurs across splitter 1014A in some embodiments. In some embodiments, splitter 114 is a conducting cable-type splitter (e.g., for a coaxial, not optical cable). Splitter 114 includes repeaters, amplifiers, signal conditioners, etc. in some embodiments.

BQUICK ISP_A server 1012A a computing device, such as a machine equipped with one or more processors, memory, and storage drives. BQUICK ISP_A server 1012A delivers assorted services to customers (e.g., residences 1016A and 1018A) for the ISP in some embodiments. BQUICK_TOP server 1005 is configured as a central hub responsible for managing and routing internet traffic for its subscribers. BQUICK ISP_A server 1012A handles requests from users such as accessing websites, sending emails, streaming content, and downloading files. BQUICK ISP_A server 1012A manages network protocols, assigns IP addresses, and facilitates communication between different devices on the internet. BQUICK ISP_A server 1012A includes operating systems like Linux or Windows Server, along with networking software such as routing protocols (e.g., BGP, OSPF), DNS (Domain Name System) servers, dynamic host configuration protocol (DHCP) servers for IP address allocation, and firewall/security software to protect system 100 from cyber threats. BQUICK ISP_A server 1012A employs traffic shaping and quality of service (QoS) mechanisms to prioritize and optimize internet traffic, ensuring a smooth and consistent user experience for all subscribers. These operations can involve managing bandwidth allocation, prioritizing certain types of traffic (e.g., VOIP or video streaming), and mitigating network congestion during peak usage periods and can be performed in response to information from server 1012. BQUICK ISP_A server 1012A employs monitoring tools or applications to continuously analyze traffic data to detect anomalies, troubleshoot network issues, and ensure compliance with service level agreements (SLAs) and regulatory requirements in some embodiments.

BQUICK_TOP server 1005 is a computing device similar to and is configured to communicate with servers 1012A and 1012B. BQUICK_TOP server 1005 includes software advantageously configured to address latency issues through network optimization, infrastructure upgrades, and efficient routing to ensure a reliable and responsive internet experience for their customers in some embodiments. BQUICK_TOP server 1005 can receive logs of network activity, including but not limited to traffic patterns, usage statistics, and security events from servers 1012A and 1012B in some embodiments. BQUICK_TOP server 1005 employs monitoring tools to continuously analyze traffic data to detect anomalies, troubleshoot network issues, and ensure compliance with service level agreements (SLAs) and regulatory requirements in some embodiments. In some embodiments, BQUICK_TOP server 1005 is a platform configured to perform latency monitoring in real time, latency analysis in real time, and latency optimization in real time. In some embodiments, the latency optimization is performed to provide a report indicating latency issues. BQUICK_TOP server 1005 can configure paths in networks 1002A and 1002B and controls devices in networks 1002A and 1002B so that low latency requirements are met in some embodiments.

BQUICK_TOP server 1005 and BQUICK ISP_B server 1012B are similar to BQUICK ISP_A server 1012A and is configured for operation with residences 1016B and 1018B. Residences 1016A, 1018A, 1016B and 1018B are similar to each other and can include similar devices. Residence 1018B includes a cable modem 1030B, a set top box 1036B, a game controller 1038, a television 1034 and a user device 1032. User device 1032 is similar to user device 1022. Head end 1008B is similar to head end 1008A, and ISP infrastructure 106B is similar to ISP infrastructure 1006A. Televisions 1024 and 1034 are monitors, smart televisions, or other audio/video equipment. Networks 1002A and 1002B can include cameras, security equipment, fire and safety equipment, smart appliances, etc. in communication with infrastructure 1006A and 106B in some embodiments. ISP infrastructure 1006A and 106B can each include fiber optic cable, coaxial cable, remote nodes, splitters, and other equipment for cable customers in some embodiments. The equipment can include amplifiers, remote physical devices or layers and remote media access control devices or layers. Intermediate nodes in ISP infrastructure 1006A and 106B can process data packets and monitor latency and traffic at various points in network. BQUICK_TOP server 1005, BQUICK ISP_B server 1012B, BQUICK_ISP_A server 1012A are controlled by ISPs (e.g., respective ISPs) in some embodiments.

ISP infrastructure 106B is coupled to residences 1016B and 1018B via a coaxial cable in some embodiments. Cable modem 1030B is a device configured to connect devices in residence 1018B to the ISP infrastructure 106B. Cable modem 1030 includes a computer, router, gateway, or other communication device in some embodiments. Modem 1030 can be configured to provide a wireless network for communicating with devices in residence 1018B. Repeaters, amplifiers, signal conditioners, etc. can be provided on the cable associated with modem 1030 in some embodiments. Cable modem refers to any device for communicating across a cable in some embodiments. Optical network unit 1020 and modem 1030 provide data connection to the ISPs data pipe over fiber or cable. All devices inside the home can be connected to the modem over WiFi or Ethernet for internet connectivity. Each node (e.g., routers, repeaters, modems, WiFi access points) inside the home can introduce latency. ONU 1020 and modem 1030 can be any device at a home or business that connects networking devices to ISPs provided internet data pipe over coaxial cable, fiber optic cable or digital subscriber line (DSL) or cell connection (e.g., via a tower (e.g. 5G, LTE modem)) in some embodiments.

Set top box 1036 is configured to receive and decode digital television signals for viewing on television 1034. Set top box 1036 can be configured for gaming operations and can communicate with a game controller 1038. Set top box 1036 can also be configured to provide internet access, shopping services, home automation, audio features, screen mirroring, etc. Set top box 1036 includes one or more processors, memory, dedicated graphics processing units (GPUs), and/or storage capacity for storing games, applications (apps), latency data, and recorded content in some embodiments. Set top box refers to any device that connects to a television set or monitor and allows users to receive and decode video signals. A set top box can serve as an interface between a television set and various broadcast media sources, such as cable, satellite, or internet-based streaming services in some embodiments. A dashed line in the drawings can represent a virtual connection and a solid line can represent a physical connection (e.g., wires or fiber optic cable).

The cloud infrastructure 1004, head end 1008A, and head end 1008B are in communication with the internet 1009 virtually or directly. Head end 1008A and head end 1008B can be associated with buildings 111A and 111B, respectively. Communication system 100 is generally an end to end combination of networking elements used for networking traffic from a home or business to internet 1009 (e.g., public internet) in some embodiments. In some embodiments, cloud infrastructure 1004 is a set multiple servers, switches, storage units. ISPs can have pool of data center/cloud servers co-located with head ends 1008A and 1008B or dedicated links to cloud infrastructure 1004 from head ends 1008A and 1008B and head end connections to internet 1009.

Although cloud infrastructure 1004 is shown as single block, cloud servers, data servers can be collocated with ISP head ends 1008A and/or 1008B. The cloud servers can be at third party private facility and ISPs can have dedicated physical links or links via internet 1009. Depending on congestion and server processing capabilities, cloud infrastructure 1004 can be a source of latency. Cloud server processing elements can be upgraded to support latency monitor applications (E.g., BQUICK applications) or can configure devices to support low latency services in some embodiments. Head ends 1008A and 1008B can be a central facility (e.g., a central office. A head end refers to a facility where internet data or audio/video content is received, processed, and routed to end subscribers like residential or business owners in some embodiments. Head ends 1008A and 1008B can have multiple switching, routing, data metering, queuing, security elements, and/or other devices which can introduce the latencies. Head ends 1008A and 1008B can also host Cable Modem Termination Systems (CMTS)

in a cable network, DSLAM (Digital Subscriber Line Access Multiplexor) in a DSL network, and OLT (Optical Line Terminal) in a fiber network.

Networks 1002A and 1002B is operated by one of as ISP-A and ISP-B. ISPs extend their services to various residences or businesses within communities, cities, or specific regions. Networks 1002A and 1002B represents two distinct networks served by same or different ISPs, which may be situated in the same neighborhood or entirely different regions or countries. Homeowners or business proprietors seek out ISPs offering services in their local areas and subscribe to internet service accordingly.

B. Applications

System 100 advantageously includes an ISP infrastructure BQUICK application 1056A for ISP infrastructure 1006A, a head end BQUICK application 1058A for head end 1008A, a modem BQUICK application 1020A for optical network unit 1020, a user device BQUICK application 1022A for user device 1022, and a television BQUICK application 1024A for television 1024. Applications 1056A, 1058A, 1020A, 1022A, and 1024A can be software apps or programs designed to perform specific tasks or provide particular functions as described herein (e.g., latency monitoring, latency analysis, and latency optimization and the communication and storage of data related thereto). Applications 1056A, 1058A, 1020A, 1022A, and 1024A can be provided on any electronic devices in communications system 100 including but not limited to servers, computers, smartphones, tablets, smart devices, appliances, cameras, security devices, vehicles, user devices, and other digital platforms. In some embodiments, applications 1056A, 1058A, 1020A, 1022A, and 1024A can be executed on Windows, macOS, IOS, Android, or other operating systems or can be web-based and accessible through internet browsers. In some embodiments, applications 1056A, 1058A, 1020A, 1022A, and 1024A can be cross-platform with an ability to be executed on multiple OS environments. Applications 1056A, 1058A, 1020A, 1022A, and 1024A can be installed from various sources such as app stores, software repositories, or directly from ISP's website. In some embodiments, applications 1056A, 1058A, 1020A, 1022A, and 1024A are configured to communicate with BQUICK_TOP server 1005 via a virtual connection. In some embodiments, applications 1056A, 1058A, 1020A, 1022A, and 1024A are configured to communicate with BQUICK_TOP server 1005 via BQUICK ISP_A server 1012A. Applications 1056A, 1058A, 1020A, 1022A, and 1024A can be updated through app stores or via automatic updates depending on device settings.

BQUICK applications 1056A, 1058A, 1020A, 1022A, and 1024A are configured to facilitate integration and communication with other services or platforms, sharing of data, collaboration, and/or access to additional functionalities seamlessly. Applications 1056A, 1058A, 1020A, 1022A, and 1024A allow optical network unit 1020, television 1024 and user device 1022 to monitor latency, store subscription information (e.g., classic bandwidth in Megabits per second (MPPS), monitor low latency bandwidth (MBPS), max jitter in milliseconds), and provide options for upgrading internet service. The latency information and subscription information can be tracked according to device, device type, user identification, application, residence identification, etc. in some embodiments. The latency information can be provided in a packet with a time stamp to BQUICK_TOP server 1005 in some embodiments. A user interface can be provided by applications 1056A, 1058A, 1020A, 1022A, and 1024A on optical network unit 1020, television 1024 and user device 1022 to upgrade or downgrade to a different level of service in light of latency information. The different level of service can be provided to latency server 150 and BQUICK_TOP server 1005, BQUICK ISP_A BQUICK server 1012A, or BQUICK ISP_B BQUICK server 1012B in some embodiments.

System 100 advantageously includes an ISP infrastructure BQUICK application 156B for ISP infrastructure 106B, a head end BQUICK application 1058B associated with head end 1008B, a modem BQUICK application 1030B for modem 1030, and a set top box BQUICK application 1036B for set top box. Applications 156B, 1058B, 1030B, and 1036B are similar to applications 1056A, 1058A, 1020A, 1022A, and 1024A. In some embodiments, when applications 1030B, 1036B, 1056A, 156B, 1058B, 1058A, 1020A, 1022A, and 1024A are installed or associated devices join the network, the applications 1030B, 1036B, 1056A, 156B, 1058B, 1058A, 1020A, 1022A, and 1024A register at server 1012 as being compliant for operations described herein. User device 1032, television 1034, and game controller 1038 can also include an application similar to BQUICK applications 1022A and 1024A.

In some embodiments, BQUICK applications 1030B, 1036B, 1056A, 156B, 1058B, 1058A, 10201020A, 1022A, and 1024A are latency applications and are configured to communicate data so that a topology report can be provided. The topology report identifies devices/networks from end-to-end. Latency requirements of each device is provided in the report (e.g., on a device by device, type of usage by type of usage, user ID by user ID, or application by application basis) in some embodiments. The report can be stored at \server 1012 in some embodiments. The latency requirements across the topology can be used to shape traffic, prioritize flow, etc. In some embodiments, the report tracks which devices are offline so that bandwidth reserved for those devices can be used for another device in some embodiments. In some embodiments, the report tracks whether the device is not running a low latency (e.g., BQUICK) application and yet is online so that bandwidth reserved for that device can be used for other devices in some embodiments. Offline refers to a state where a device, system, or application is not actively communicating with other devices or accessing online resources in some embodiments. A device that is off or asleep is offline in some embodiments. A low latency application can be offline when the low latency application is not running in some embodiments.

In some embodiments, the low latency packets are marked so that applications 1030B, and 1036B, 1056A, 156B, 1058B, 1058A, 1020A, 1022A, and 1024A can process the packets and flow as a low latency flow. In some embodiments, the end device (e.g., application 1024A) can send a command or request indicating that latency requirements are not being met and each application in the path (applications 1020A 1056A, and 1058A) can respond to that command to process the packets for that device at a higher priority or remove traffic from that path in some embodiments. Latency issues can be sourced from an AP, a mesh, a device, or a node. Tracking bit rates or latencies at each location allow solutions to be directed to the particular location of the latency issue.

Figure 1B:
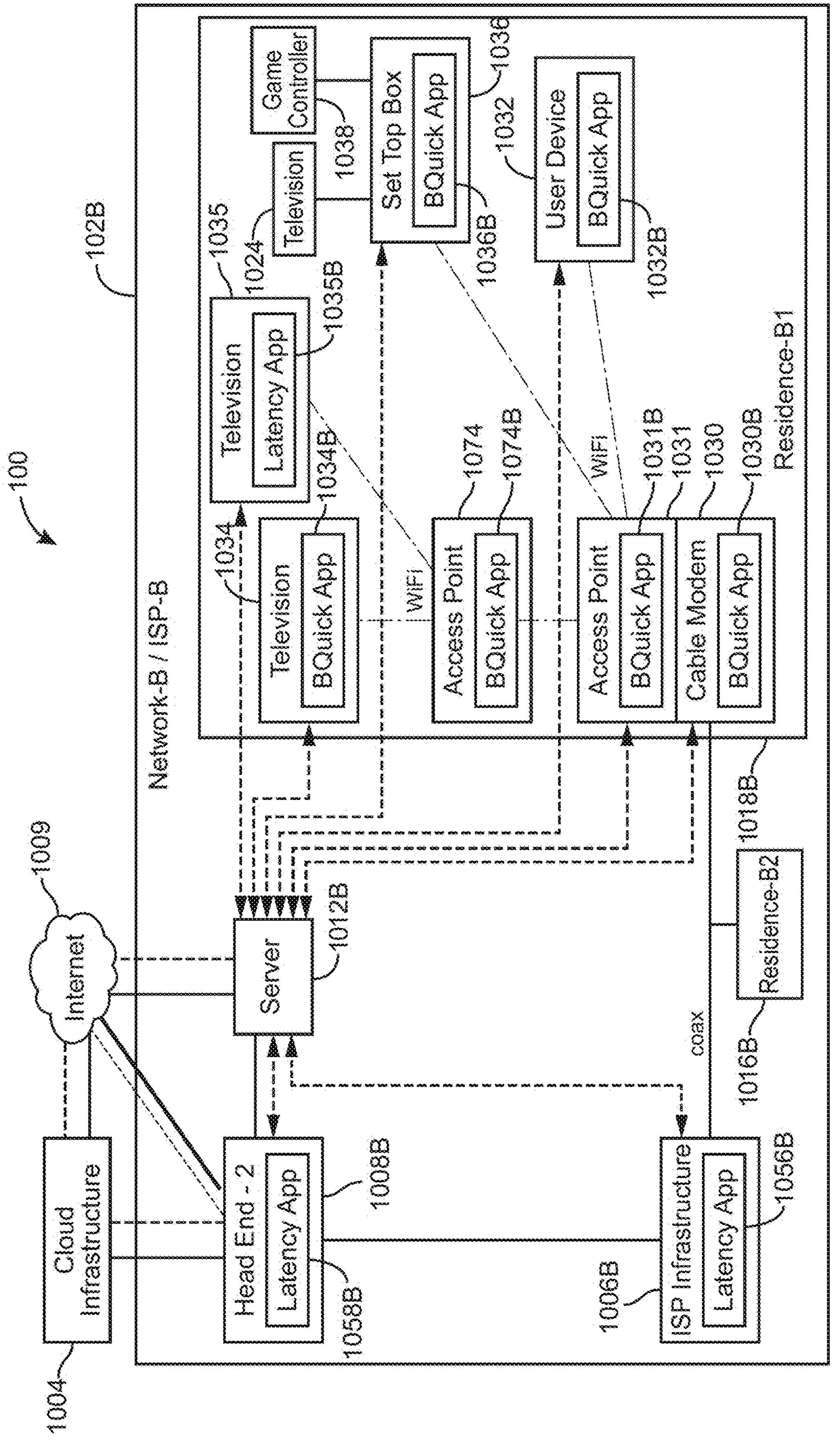
FIG. 1B illustrates a general schematic block diagram of a portion of the communication system illustrated in FIG. 1A, in accordance with one or more embodiments.

With reference to FIG. 1B, residence 1018B can include an access point 1031 in communication with modem 1030, a wireless router 1074 in communication with television 1034, a television 1035, set top box 1036, and user device 1032. Access point 1031 can be integrated with modem 1030 or can be a separate unit. User device 1032 includes a user device BQUICK application 1032B, and access point 1031 includes a latency access point application 1031B. Router 1074 includes a wireless router BQUICK application 1074B, television 1034 includes a television BQUICK application 1034B, and television 1035 includes a television BQUICK application 1035B. BQUICK_TOP server 1005, BQUICK_ISP_A server 1012A, and BQUICK_ISP_B server 1012B are in virtual communication with applications 1030B, 1031B, 1036B, 1074B 1032B, 1034B, 1035B, 156B, and 1058B in some embodiments. A server refers to any computing device that provides services or resources to other computers or clients within a network in some embodiments.

Applications 1030B, 1031B, 1036B, 1074B, 1032B, 1034B, 1035B, 156B, and 1058B are similar to applications 1056A, 1058A, 1020A, 1022A, and 1024A. Applications 1030B, 1031B, 1036B, 1074B, 1032B, 1034B, 1035B, 156B, and 1058B allow modem 1030, televisions 1034 and 1035, access point 1031, router 1074, set top box 1036, and user device 1032 as well as other cable modem termination systems to monitor latency, store subscription information (e.g., classic bandwidth in Megabits per second (MPPS), low latency bandwidth (MBPS), max jitter in milliseconds), and provide options for upgrading internet service. A user interface can be provided on optical network unit 1020, television 1024 and user device 1022 to upgrade or downgrade to a different level of service in light of latency information. This ability is available even if the devices are third party devices in some embodiments. In some embodiments, application 1031B or 1074B can be configured to update network topology information to BQUICK TOP server 1012, and applications 1030B, 1031B, 1036B, 1074B, 1032B, 1034B, 1035B, 156B, and 1058B can monitor low latency resources, request services, register devices, and request different latency treatment (e.g., for video, audio, commands, downloads, etc.). In some embodiments, devices or nodes associated with applications 1030B, 1031B, 1036B, 1074B 1032B, 1034B, 1035B, 156B, and 1058B can include algorithms for changing packet priority with time and latency requirements. Applications 1030B, 1031B, 1036B, 1074B, 1032B, 1034B, 1035B, 156B, and 1058B can communicate using virtual or logical connections (e.g., using internet 1009).

Access point 1031 is a networking device that allows Wi-Fi-enabled devices to connect to a wired network. Access point 1031 serves as a bridge between wireless devices, such as wireless router 1074, set top box 1036, user device 1032, televisions 1034 and 1035, and the wired network infrastructure, such as, modem 1030, routers, switches, and servers, in some embodiments. Wireless router 1074 can be a networking device that provides a wireless access point for a wireless network. Wireless router 1074 serves as a hub for a wireless local area network (LAN), allowing multiple devices in or around residence 1018B to connect to the internet and communicate with each other. Wireless router 1074 can include wirelessly built-in Ethernet switches which provide multiple ports for connecting wired devices. A wired connection can connect router 1074 to access point 1031 or modem 1030 in some embodiments. Wireless router refers to any device that provides a wireless access point for a wireless network in some embodiments.

Figure 1C:
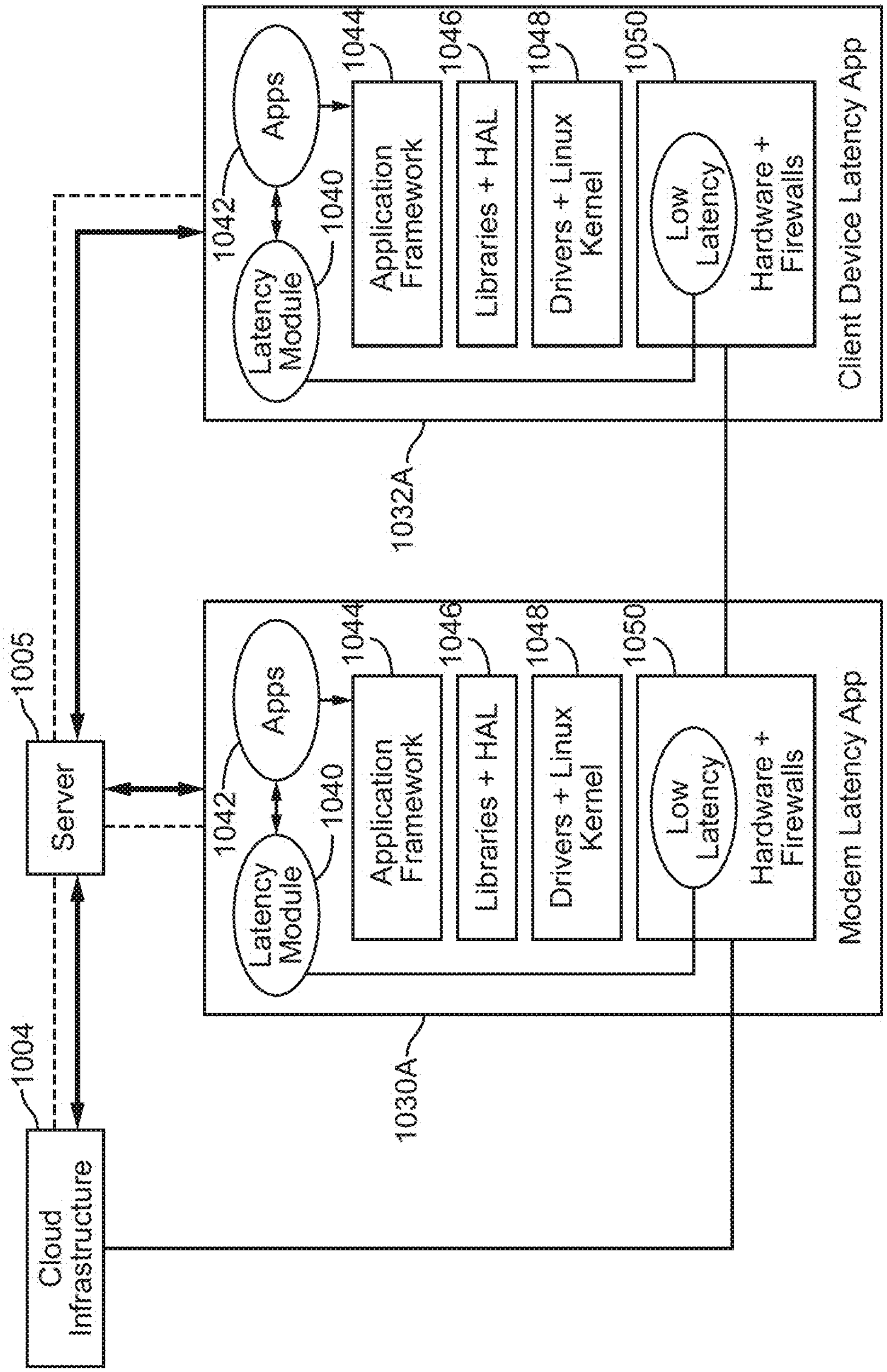
FIG. 1C illustrates a general schematic block diagram of applications in communication with cloud infrastructure for the communication system illustrated in FIG. 1A, in accordance with one or more embodiments.

With reference to FIGS. 1B-1C, applications 1030B and 1032B are in communication with BQUICK_TOP server 1005 via a logical interface. The architecture of applications 1030B and 1032B can be used in any of applications 1031B, 1036B, 1074B 1034B, 1035B, 156B, 1058B, 1056A, 1058A, 1020A, 1022A, and 1024A. The logical interface is a virtual interface that represents a specific network configuration or functionality within a networking device, such as modem 1030 or user device 1032. The logical interface is software defined and can be created, configured, and managed within the device's operating system in some embodiments.

Applications 1030B and 1032B can be provided with modems, routers, access points, mesh devices, set top boxes, AR/VR devices, game consoles, phones, over the top devices (OTTs), etc. Applications 1030B, 1032B, and cloud infrastructure 1004 can communicate using app to app communication. App to app communication is an exchange of data, messages, or commands between two or more software applications running on the same device or different devices over a network in some embodiments. App to app communication enables seamless integration and collaboration between different apps, allowing them to share information, trigger actions, or synchronize state without requiring user intervention in some embodiments. BQUICK_TOP server 1012 can include an application for monitoring and/or determining end to end latency.

In some embodiments, applications 1020A, 1024A, 1032B, 1034B, 1035B, 1036B, and 1032B are client level applications. Applications 1036B can be configured for highest priority (e.g., lowest latency applications) while ordinary streaming latencies are associated with applications 1020A, 1024A, 1032B, 1034B, 1035B, 1032B. Applications 137A and 1031B are node level application and can be configured to provide or assign priority for applications 1020A, 1024A, 1032B, 1034B, 1035B, 1036B, and 1032B (client level applications) and associated devices. Application 1030B can be configured to provide or assign priority between application 1036B, applications 137A and 1031B (e.g., node level applications), and applications 1020A, 1024A, 1032B, 1034B, 1035B, and 1032B (e.g., client level applications) as well as their associated devices. Cloud level applications can include applications 156B and 1058B in some embodiments. In some embodiments, the partitioning of applications 156B, 1058B, 1020A, 1024A, 1030B, 1032B, 1034B, 1035B, 1036B, 137A, and 1032B allows for segregation of local and cloud processing, reduction in cloud server communication and ISP bandwidth, local data storage and security, availability of local resources (including edge processing and filtering of information), and faster response to low latency devices. In some embodiments, application 1030B has a server extension and handles communication between server 1012 and applications 1020A, 1024A, 1032B, 1034B, 1035B, 1036B, and 1032B.

When application 1030B includes the server extension, application 1030B can be a client level application or a cloud level application and maintain a virtual connection to server 1012 in some embodiments. The server extensions can provide advantages of decoupling development from ISPs which can be helpful for standardization, of having a direct data path from application 1020A or 1031B to app developer servers, of maintaining local data privacy, of availability of local resources (e.g., local machine learning (ML), edge processing and filtering information), and of faster response to local low latency gadgets or devices in some embodiments.

In some embodiments, applications 156B, 1058B, 1020A, 1024A, 1030B, 1032B, 1034B, 1035B, 1036B, 137A, and 1032B can achieve synchronization of the wall clock across all nodes and end user devices. Applications 156B, 1058B, 1020A, 1024A, 1030B, 1032B, 1034B, 1035B, 1036B, 137A, and 1032B utilize timestamps for low-latency data packets at each node. This enhancement enables the determination of latency at each node and reporting to server 1012 in some embodiments. By utilizing a precision time protocol (PTP), applications 156B, 1058B, 1020A, 1024A, 1030B, 1032B, 1034B, 1035B, 1036B, 137A, and 1032B can distinguish whether latency arises from the home network, an ISP, or cloud servers using time stamps in some embodiments. Each device can have an associated PTP clock that communicates with the application associated with the device. The latency per node can be shared across networks so that networks can avoid devices having latency issues or can perform other operations to reduce latency at that node (e.g., divert higher latency traffic away from the node having issues). The PTP clock can be derived form a satellite clock in some embodiments.

With reference to FIG. 1C, applications 1030B and 1032B each include a latency module 1040, applications 1042, an application framework 1044, libraries and hardware abstraction layer 1046, drivers and linux kernel 1048, and hardware and firewalls 1050. In some embodiments, latency module 1040 is configured to control and monitor hardware and firewalls based upon latency. Latency module or BQUICK module 1040 is software configured to provide the low latency operations described herein. Applications 1042 are apps for performing various operations and can include third part apps (e.g., android package kit (APK)). Application framework 1044 is a structured set of software components that provide the necessary infrastructure for building and running applications.

Libraries and hardware abstraction layer 1046 provides standardized interfaces for device drivers to interact with hardware components. Libraries and hardware abstraction layer 1046 allows applications and system services to access hardware functionalities in a consistent manner across different devices. Libraries and hardware abstraction layer 1046 provide collections of pre-written code that developers can use to perform common tasks or implement specific functionalities and generally contain reusable functions, classes, or modules that provide specific capabilities.

Drivers and linux kernel 1048 serves as the bridge between the hardware and the software layers of the system, managing system resources in some embodiments. Drivers and linux kernel 1048 provide essential services and facilitate communication between software processes and hardware devices in some embodiments. Drivers and linux kernel 1048 includes software components that facilitate communication between the operating system (OS) and hardware devices in some embodiments.

Figure 1D:
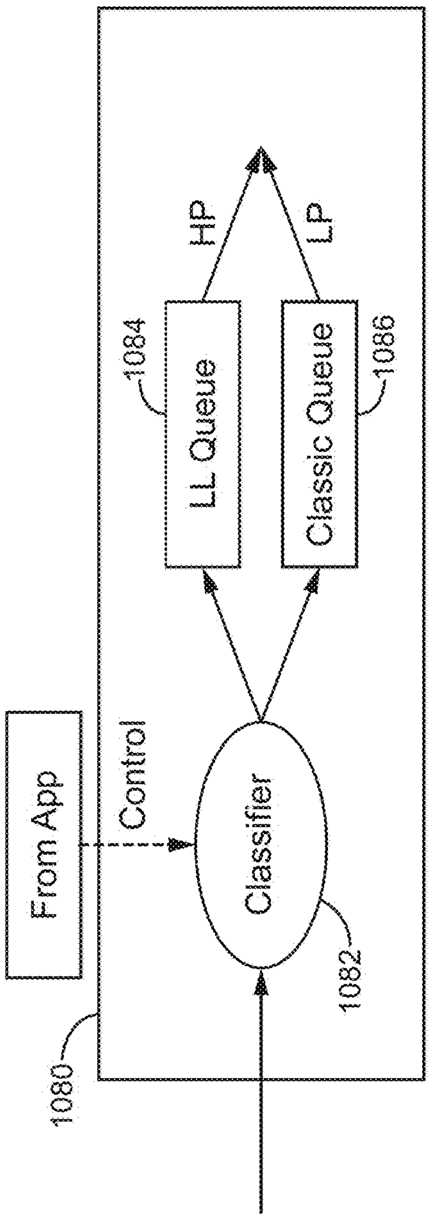
FIG. 1D illustrates a general schematic block diagram of an application for a communication system illustrated in FIG. 1A, in accordance with one or more embodiments.

With reference to FIG. 1D, a function, service, process, or operation 1080 can controlled by any of applications 1030B, 1031B, 1036B, 1074B, 1032B, 1034B, 1035B, 156B, 1058B, 1056A, 1058A, 1020A, 1022A, and 1024A (FIGS. 1A and 1B). Operation 1080 use a classifier 1082, a low latency queue 1084, and a classic queue 1086. Queues 1084 and 1086 are memory or data structures used to manage the flow of packets or messages within a network device or system 100 (FIG. 1A). Queue 1084 is associated with a high performance path, and queue 1086 is associated with a low performance path in some embodiments. A queue refers to any structure for storing information (e.g., packets) in some embodiments. Any networking device can have separate queue to support low latency traffic and operation can be performed any device in communication system 100 (FIG. 1A). Applications 1030B, 1031B, 1036B, 1074B, 1032B, 1034B, 1035B, 156B, 1058B, 1056A, 1058A, 1020A, 1022A, and 1024A can report latency for each queue independently.

Queues 1084 and 1086 are configured as first-in-first-out (FIFO) buffers that temporarily hold packets or messages before messages are transmitted or processed in some embodiments. Queue 1084 can store messages for the high performance path (e.g., low latency path), and queue 1086 can store messages for the low performance path (e.g., high latency path) in some embodiments. In some embodiments, a low latency operations may use a low performance path, and a high latency operations may use the high performance path, or each uses the same path. A path refers to any communication route or channel through which data or information travels from a source to a destination (e.g., through devices and across mediums) in some embodiments. A path can include intermediate components and links involved in transmitting data between two or more points in one or more networks in some embodiments. A low latency path refers to a path for low latency traffic in some embodiments.

Classifier 1082 is processor and/or software configured to categorize or classify network traffic based on certain criteria (e.g., by latency requirements and/or priority). Classifier 1082 is configured to enforce network policies, prioritize traffic (e.g., for the high performance or low performance path), and/or apply specific actions based on the classification results in some embodiments. Classifier 1082 is used to differentiate between different classes of traffic (e.g., voice, video, data) and apply QoS policies to ensure that critical applications receive adequate bandwidth and latency requirements. Classifier 1082 prioritizes traffic based on predefined criteria, ensuring that important or time-sensitive applications receive preferential treatment over less critical traffic by appropriately providing traffic to queue 1084 and queue 1086. Classifier 1082 can utilize information about customer subscriptions (e.g., device level, user level, residence level) to classify traffic in some embodiments.

Figure 1E:
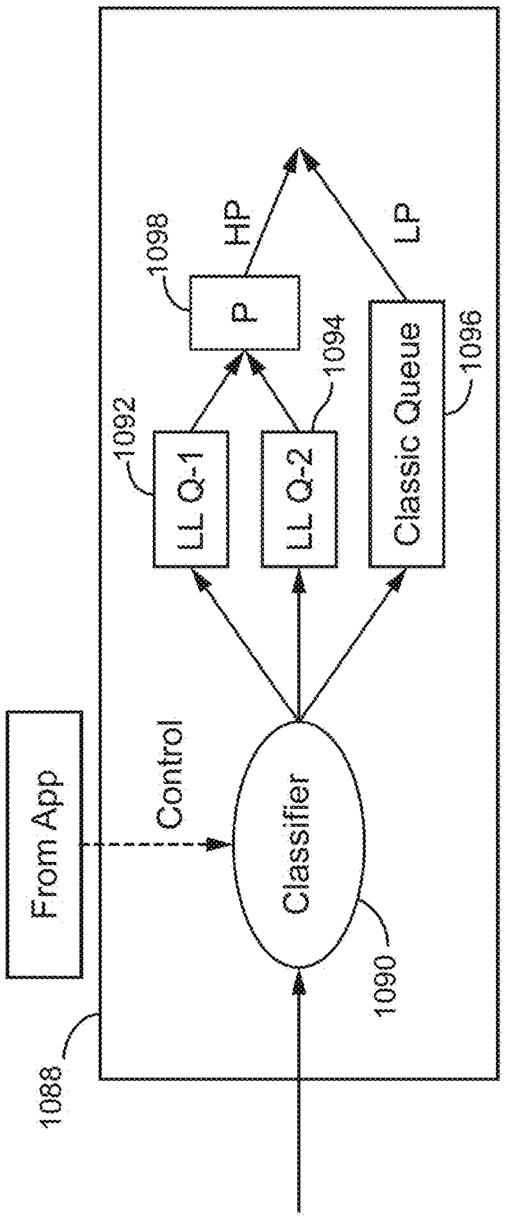
FIG. 1E illustrates a general schematic block diagram of an application for a communication system illustrated in FIG. 1A, in accordance with one or more embodiments.

With reference to FIG. 1E, an operation 1088 can be controlled by any of applications 1030B, 1031B, 1036B, 1074B, 1032B, 1034B, 1035B, 156B, 1058B, 1056A, 1058A, 1020A, 1022A, and 1024A. Operation 1088 is similar to operation 1080 and utilizes a classifier 1090, a first low latency queue 1092, a second latency latency queue 1094, a classic queue 1096, and a priority queue 510. Queues 1092, 1094, 1096 and 1098 are memory or data structures used to manage the flow of packets or messages within a network device or system 100 (FIG. 1A). Queues 1092 and 1094 are associated with a high performance path, and queue 1096 is associated with a low performance path in some embodiments. Queue 1098 receives messages from queues 1092 and 1094 and provide messages or data to the high performance path based upon a priority scheme associated with queues 1092 and 1094 in some embodiments. Classifier 1090 is similar to classifier 1082 and is configured to categorize or classifying network traffic based on certain criteria (e.g., by latency requirements) for queues 1092, 1094, and 1096 in some embodiments. In some embodiments, classifiers 1082 and 1090 are software modules operating on a device (e.g., server, ISP supplied device, user device, etc.). In some embodiments, queues 1084, 1086, 1092, 1094, 1096 and 1098 are virtual queues provided on the memory of the device configured by operation 1080 or 1088. In some embodiments, queues 1084, 1086, 1092, 1094, 1096 and 1098 are dedicated hardware queues (e.g., FIFO memories) on the device. Classifiers 1090 and 1082 and queues 1084, 1086, 1092, 1094, 1096 and 1098 are implemented in an application layer of the device and may utilize services and structures provided by the media access layer and the physical layer in some embodiments. Classifiers 1082 and 1090 can be configured by commands provided by BQUICK TOP server 1012 to appropriately classify low latency traffic in some embodiments.

In some embodiments, applications 1080 and 1088 are configured to operate at nodes associated with devices including but not limited to ONU 1020, modem 1030, set top box 1036, television 1024, access point 1031, user device 1032, and/or router 1074. Applications 1080 and 1088 are configured to control and/or partition subscribed low latency bandwidth traffic (e.g., 20 Mbps vs 50 Mbps), track latency statistics (e.g., minimum, maximum, average latencies for low latency flows), process five tuples (e.g., source IP address, source port, destination IP address, destination port, transport protocol) for X number of flows (where X is any integer) with latency and/or bandwidth requirements, monitor latency introduced by a node, provide timestamps at ingress and egress ports, monitor buffer depths, perform boundary clock precision protocol (e.g., IEEE 10588-2008 standard and extensions thereof), and prioritize of traffic among multiple low latency clients. Monitored and measured information can be appended to packets for provision to other nodes and servers (e.g., server 1012). For example, time stamps can be applied to packets at each node or device. Latency can be determined by comparing time stamps. Applications 1080 and 1088 are also configured to track status of low latency applications and provide a user interface for controlling low latency configurations in some embodiments. Classifiers 1082 and 1090 and/or queues 1084, 1086, 1092, 1094, 1096 are configured by applications 1030B, 1031B, 1036B, 1074B, 1032B, 1034B, 1035B, 156B, 1058B, 1056A, 1058A, 1020A, 1022A, and 1024A (e.g., at each respective node) in some embodiments. In some embodiments, servers 1012, 1012A, and 1012B configure classifiers 1082 and 1090 and/or queues 1084, 1086, 1092, 1094, 1096 via virtual connections.

Applications 1080 and 1088 can identify end to end bandwidth available for low latency applications, provide a user real time feedback of monitored latency, and adjust latency responses. The adjustment may be in response to purchased services or bandwidth upgrades in some embodiments. In some embodiments, applications 1080 and 1088 can be configured to provide an advertisement or customer offer for low latency resources. Applications 1080 and 1088 can address variable latency for each user and adjust response for the latency level at a particular time, for a particular time period, etc. Latency information can be communicated to servers 1012A, 1012B, and 1012 and applications 1030B, 1031B, 1036B, 1074B, 1032B, 1034B, 1035B, 156B, 1058B, 1056A, 1058A, 1020A, 1022A, and 1024A as timestamps appended to packets as described herein, or to a packet identifier (e.g. 5 tuples and sequence number) in some embodiments. The time stamp information can be sent to servers 1012A, 1012B, and/or 1012 via an independent virtual/logical channel in some embodiments.

Figure 1F:
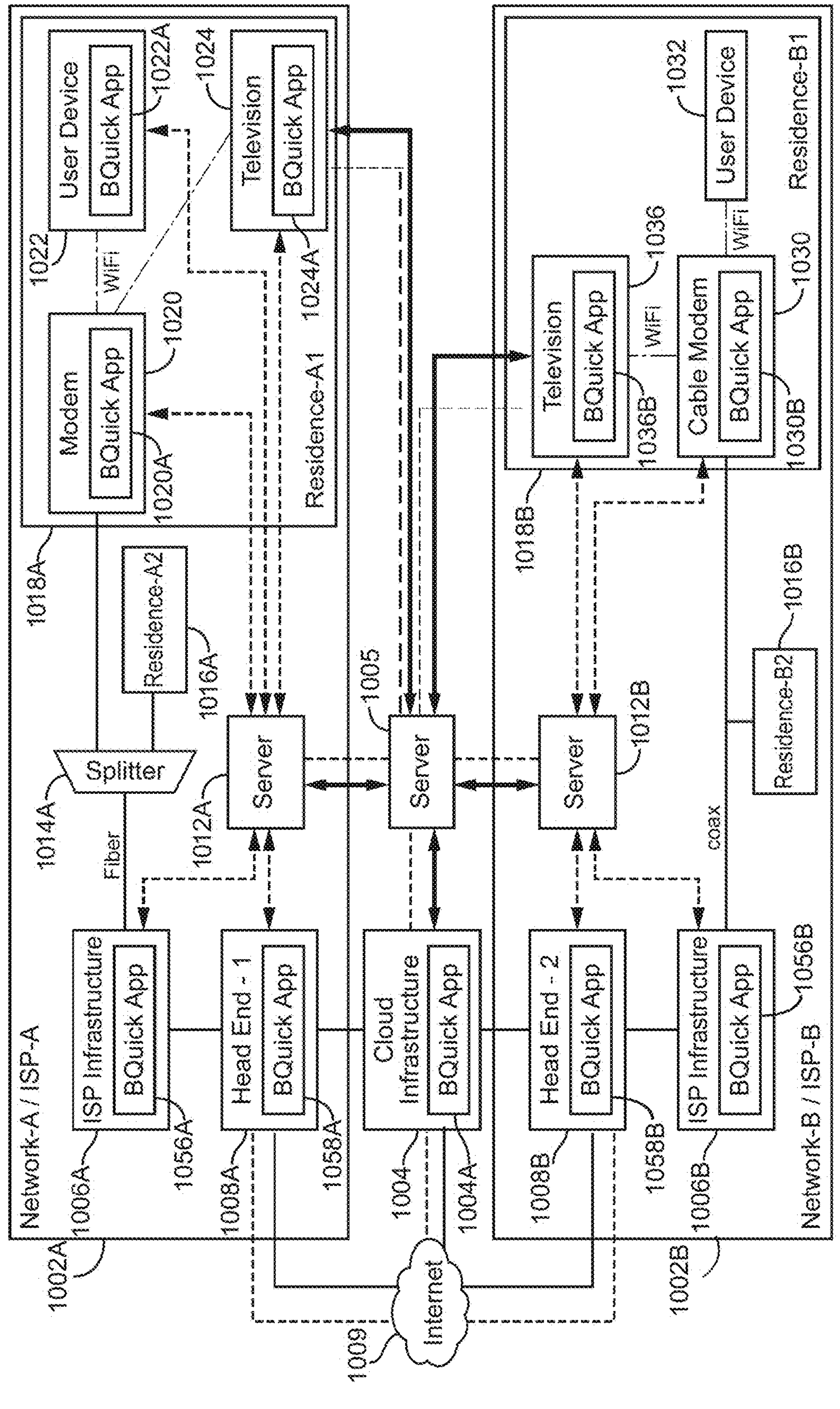
FIG. 1F illustrates a schematic block diagram of the communication system illustrated in FIG. 1A, including a server configured for augmented reality/virtual reality, and/or metaverse applications, in accordance with one or more embodiments.

With reference to FIG. 1F, cloud infrastructure 1004 can include an application 1004A. Application 1004A is similar to applications 1030B, 1031B, 1036B, 1074B 1032B, 1034B, 1035B, 156B, and 1058B. BQUICK TOP server 1012 can be configured to monitor AR/VR applications and/or metaverse applications. An application executed on BQUICK TOP server 1012 can perform the monitoring functions. Application 1004A is in communication with BQUICK TOP server 1012. Servers 1012A and 1012B can include an application similar to application 1004A.

Using applications, 1020A, 1024A, 1030B, 1032B, 1034B, 1035B, 1036B, 137A, and 1032B, the devices given by ISPs, customer-owned AR/VR setups, mobile phones, over the top (OTT) devices, and cloud gaming clients are capable of facilitating low latency uses. Applications, 1020A, 1024A, 1030B, 1032B, 1034B, 1035B, 1036B, 137A, and 1032B allow devices in residences 1018A and 1018B to interact with the server extension integrated in the ONU 1020 and modems 1030 or routers (e.g., ISP provided). Additionally, the server extensions have the ability to filter and transmit all necessary information to servers 1012A and 1012B or share open data with application developers.

C. Computing Environment

Prior to discussing the specifics of embodiments of the systems and methods of the present solution, it may be helpful to discuss the computing environments in which such embodiments may be deployed.

Figure 2A:
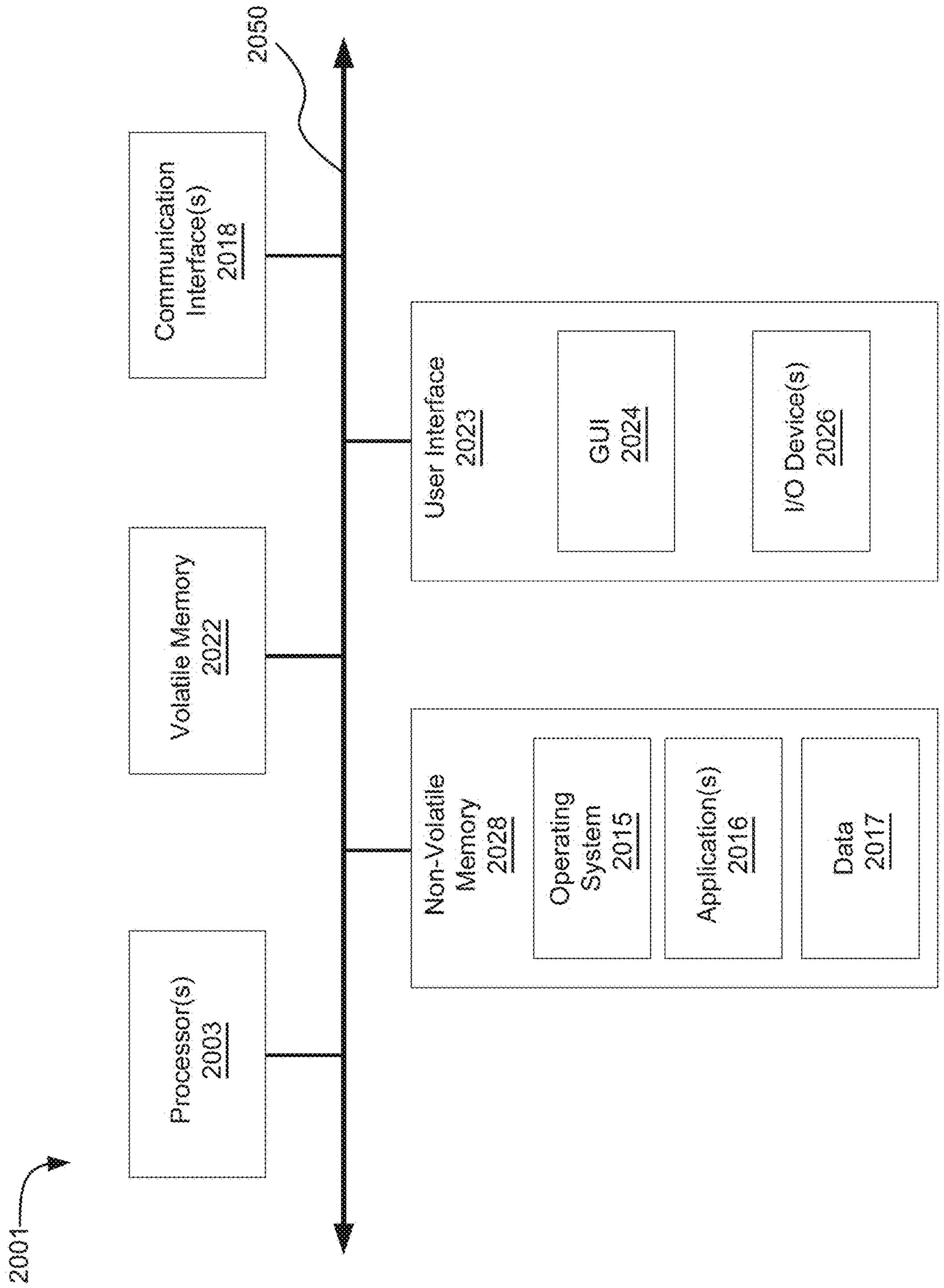
FIG. 2A illustrates a block diagram of embodiments of a computing device, in accordance with one or more embodiments.

As shown in FIG. 2A, computer 2001 may include one or more processors 2003, volatile memory 2022 (e.g., random access memory (RAM)), non-volatile memory 2028 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 2023, one or more communications interfaces 2018, and communication bus 2050. User interface 2023 may include graphical user interface (GUI) 2024 (e.g., a touchscreen, a display, etc.) and one or more input/output (I/O) devices 2026 (e.g., a mouse, a keyboard, a microphone, one or more speakers, one or more cameras, one or more biometric scanners, one or more environmental sensors, one or more accelerometers, etc.). Non-volatile memory 2028 stores operating system 2015, one or more applications 2016, and data 2017 such that, for example, computer instructions of operating system 2015 and/or applications 2016 are executed by processor(s) 2003 out of volatile memory 2022. In some embodiments, volatile memory 2022 may include one or more types of RAM and/or a cache memory that may offer a faster response time than a main memory. Data may be entered using an input device of GUI 2024 or received from I/O device(s) 2026. Various elements of computer 2001 may communicate via one or more communication buses, shown as communication bus 2050.

Computer 2001 as shown in FIG. 2A is shown merely as an example, as clients, servers, intermediary and other networking devices and may be implemented by any computing or processing environment and with any type of machine or set of machines that may have suitable hardware and/or software capable of operating as described herein. Processor(s) 2003 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 2018 may include one or more interfaces to enable computer 2001 to access a computer network such as a Local Area Network (LAN), a Wide Area Network (WAN), a Personal Area Network (PAN), or the Internet through a variety of wired and/or wireless or cellular connections.

In some implementations, the computing device 2001 may execute an application on behalf of a user of a client computing device. For example, the computing device 2001 may execute a virtual machine, which provides an execution session within which applications execute on behalf of a user or a client computing device, such as a hosted desktop session. The computing device 2001 may also execute a terminal services session to provide a hosted desktop environment. The computing device 2001 may provide access to a computing environment including one or more of: one or more applications, one or more desktop applications, and one or more desktop sessions in which one or more applications may execute.

Figure 2B:
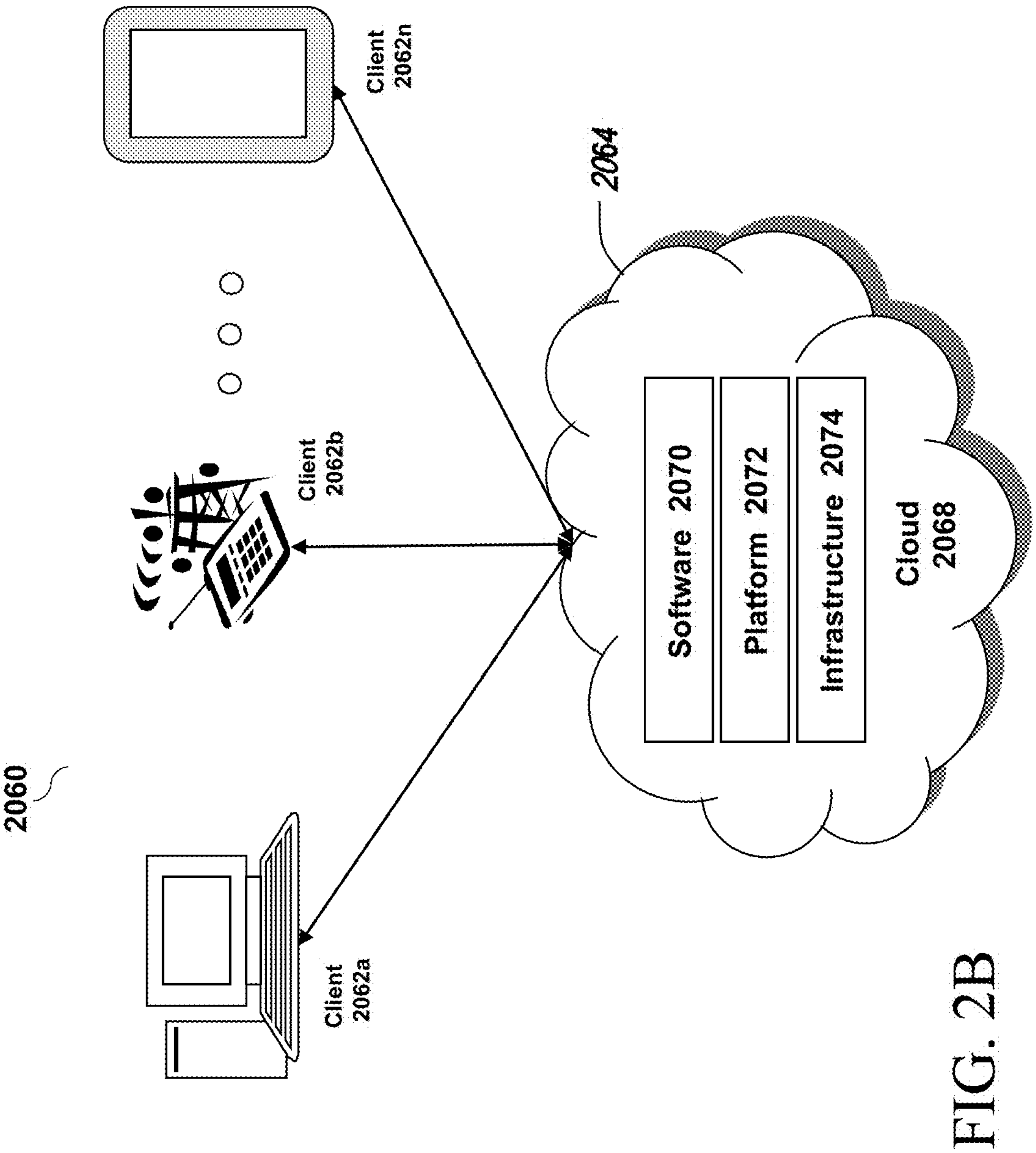
FIG. 2B illustrates a block diagram depicting a computing environment comprising a client device in communication with cloud service providers, in accordance with one or more embodiments.

Referring to FIG. 2B, a computing environment 2060 is depicted. Computing environment 2060 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 2060 can provide the delivery of shared services (e.g., computer services) and shared resources (e.g., computer resources) to multiple users. For example, the computing environment 2060 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 2060 may provide client 2062 with one or more resources provided by a network environment. The computing environment 2062 may include one or more clients 2062*a*-2062*n*, in communication with a cloud 2068 over one or more networks 2064. Clients 2062 may include, e.g., thick clients, thin clients, and zero clients. The cloud 108 may include back end platforms, e.g., servers 106, storage, server farms or data centers. The clients 2062 can be the same as or substantially similar to computer 2001 of FIG. 2A.

The users or clients 2062 can correspond to a single organization or multiple organizations. For example, the computing environment 2060 can include a private cloud serving a single organization (e.g., enterprise cloud). The computing environment 2060 can include a community cloud or public cloud serving multiple organizations. In embodiments, the computing environment 2060 can include a hybrid cloud that is a combination of a public cloud and a private cloud. For example, the cloud 108 may be public, private, or hybrid. Public clouds 108 may include public servers that are maintained by third parties to the clients 2062 or the owners of the clients 2062. The servers may be located off-site in remote geographical locations as disclosed above or otherwise. Public clouds 2068 may be connected to the servers over a public network 2064. Private clouds 2068 may include private servers that are physically maintained by clients 2062 or owners of clients 2062. Private clouds 2068 may be connected to the servers over a private network 2064. Hybrid clouds 2068 may include both the private and public networks 2064 and servers.

The cloud 2068 may include back end platforms, e.g., servers, storage, server farms or data centers. For example, the cloud 2068 can include or correspond to a server or system remote from one or more clients 2062 to provide third party control over a pool of shared services and resources. The computing environment 2060 can provide resource pooling to serve multiple users via clients 2062 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 2060 can provide on-demand self-service to unilaterally provision computing capabilities (e.g., server time, network storage) across a network for multiple clients 2062. The computing environment 2060 can provide an elasticity to dynamically scale out or scale in responsive to different demands from one or more clients 2062. In some embodiments, the computing environment 2060 can include or provide monitoring services to monitor, control and/or generate reports corresponding to the provided shared services and resources.

In some embodiments, the computing environment 2060 can include and provide different types of cloud computing services. For example, the computing environment 2060 can include Infrastructure as a service (IaaS). The computing environment 2060 can include Platform as a service (PaaS). The computing environment 2060 can include serverless computing. The computing environment 2060 can include Software as a service (SaaS). For example, the cloud 2068 may also include a cloud based delivery, e.g. Software as a Service (SaaS) 2070, Platform as a Service (PaaS) 2072, and Infrastructure as a Service (IaaS) 2074. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by Right Scale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 2062 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 2062 may access PaaS resources with different PaaS interfaces. Some PaaS interfaces use HTTP packages, standard Java APIs, Java Mail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 2062 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 2062 may also access SaaS resources through smartphone or tablet applications, including, e.g., Salesforce Sales Cloud, or Google Drive app. Clients 2062 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Although examples of communications systems described above may include devices operating according to an Ethernet and other standards, it should be understood that embodiments of the systems and methods described can operate according to alternative standards and use wireless communications devices other than devices configured as devices. For example, multiple-unit communication interfaces associated with cellular networks, satellite communications, vehicle communication networks, wired networks, and networks can utilize the systems and methods described herein without departing from the scope of the systems and methods described herein.

D. Systems and Methods for Latency Improvement for Wireless Speakers

Below are detailed descriptions of various concepts related to, and embodiments of, techniques, approaches, methods, apparatuses, and systems for improving latency for wireless speakers. The various concepts introduced above and discussed in greater detail below may be implemented in any of numerous ways, as the described concepts are not limited to any particular manner of implementation. Examples of specific embodiments and applications are provided primarily for illustrative purposes.

The technical solutions of the present disclosure are directed to improving the latency of wireless speakers in wireless entertainment systems. In particular, the present disclosure is directed to wirelessly distributing audio during multimedia content playback to maintain synchronization between audio and video. In wireless entertainment systems and, in some embodiments, latency of audio may refer to the time difference between a time that multimedia content (such as a movie, TV show, or music), or audio portion thereof, is sent from the source (e.g., a media player) and when the audio portion is outputted by the speakers to the user. The problem can be a result of wireless transmission and processing delays, which may be due to network conditions, bandwidth restrictions, or the latency characteristics of technologies such as Bluetooth and Wi-Fi.

The aforementioned delays can disturb synchronization between audio and video. The technical solution includes establishing a buffer pipe between wireless chips in a media player and a wireless speaker, using the Inter-IC Sound (I2S) protocol for audio data transmission. The wireless chip in the media player can receive audio data samples and communicate them to the wireless chip in the wireless speaker, bypassing portions of a transport layer stack. The direct transmission can reduce or minimize latency, and the audio data can be transmitted to the digital audio converter of the wireless speaker for output. The technical solution provides a low latency data pipe facilitated by an access point, acting as the intermediary for connectivity between the media player and the wireless speaker. Additionally, establishing a constant bit rate pipe for audio data flow from the media player to the access point and a high priority data pipe from the access point to the wireless speaker can prioritize audio transmission over other network traffic.

Figure 3A:
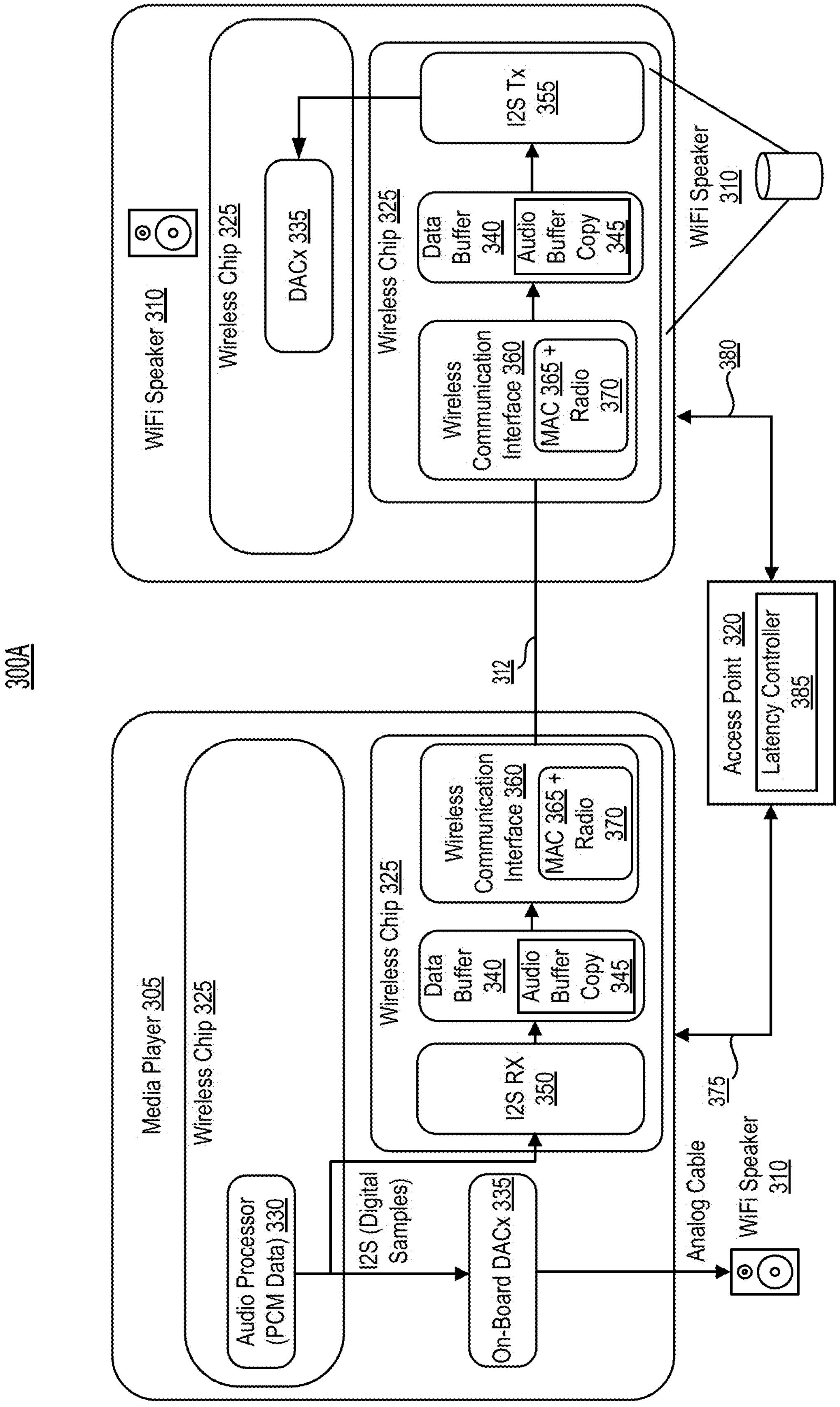
FIG. 3A illustrates a block diagram of an example system for improving latency for wireless speakers, in accordance with one or more embodiments.

FIG. 3A illustrates an example system 300A for improving latency for wireless speakers. Example system 300A can include one or more servers 1005 communicatively coupled with one or more media players 305 and one or more wireless speakers 310 over one or more access points 320. The example system 300A can include one or more constant bit rate pipes 375 between the media player 305 and the access point 320 and one or more high priority data pipes 380 between the wireless speaker 310 and the access point 320. The access point 320 can include one or more latency controllers 385.

The media player 305 can include one or more audio processors 330 and one or more wireless chips 325. The wireless chip 325 can include one or more Inter-IC Sound (I2S) receivers 350, one or more data buffers 340, and one or more wireless communication interfaces 360. The data buffer 340 can include one or more audio buffer copies 345. The wireless communication interface 360 can include one or more machine access control (MAC) layers 365 and one or more wireless radio systems 370. The wireless speaker 310 can include one or more digital audio converters 335 and one or more wireless chips 325. The wireless chip 325 of the wireless speaker 310 can include one or more I2S transmitters 355, one or more data buffers 340, and one or more wireless communication interfaces 360.

The media player 305 can be a system, device, software, application, or other executable instructions executable on a device and configured to play multimedia content, including video and audio data. The media player 305 can be configured to play audio, such as music. The media player 305 can include set-top boxes (STBs), televisions (TV), home theater systems, and over-the-top (OTT) devices. The media player 305 in STBs, which cable or satellite TV providers may supply, can decode and display TV channels while frequently integrating recording and streaming features. The media player 305 can provide access to on-demand content and apps from different services. The media player 305 in televisions can have built-in capabilities to play local media files stored on USB drives or network-attached storage and may access streaming services directly through built-in apps. In some embodiments, the media player 305 can be part of a system configured for high-quality audio and video playback, where the functionality can be integrated into the receiver or as a separate component, often supporting various file formats and playback features. The media player 305 in OTT devices can connect to TVs and stream content from online services.

The media player 305 can communicate via a network 2064 (e.g., home or local) to stream content from different content sources over the Internet, as shown in connection with FIG. 2B. The media player 305 can receive content, such as movies, music, etc., from a variety of electronic devices, such as computers, smartphones, and Internet of Things (IoT) devices, over the network 2064. Any or all of the computing devices described herein may communicate wirelessly (e.g., via Wi-Fi, cellular, radio, etc.) with a transceiver that is hardwired (e.g., via a fiber optic cable, a CAT5 cable, etc.) to other computing devices in the network 2064. Any or all of the computing devices described herein may also communicate wirelessly with the computing devices of the network 2064 via a proxy device (e.g., a router, access point, network switch, or gateway).

The wireless speaker 310 can be a device configured to output audio through one or more speaker from audio data or signals received wirelessly from another device, application, or system, such as without the need for physical cables to connect the speaker's audio input to the audio source (e.g., media player 305). The wireless speaker 310 can use wireless communication technologies, such as Bluetooth or Wi-Fi, to receive audio signals from smartphones, computers, televisions, or other devices. In some embodiments, the wireless speaker 310 can be paired or grouped together through the same network to create a synchronized audio system across multiple rooms or areas. In some embodiments, the wireless speaker 310 can be powered by batteries or through any sources of electricity, providing portability and usage scenarios.

The audio processor 330 can include any combination of hardware and software for processing audio data, such as sampling, encoding, decoding, formatting, and the like. The hardware can include digital signal processors (DSPs), field-programmable gate arrays (FPGAs), or microcontrollers. The software can include audio processing libraries or custom algorithms. The audio data can include pulse code modulation (PCM) audio data. The audio processor 330 can perform one or more tasks, including, but not limited to, decoding, encoding, mixing, equalization, and volume control, among others. Decoding can include converting compressed audio formats, such as MP3 (MPEG audio layer 3) or AAC (advanced audio coding), into uncompressed digital data. Encoding can include converting uncompressed digital audio data into compressed formats for storage or transmission. Mixing can include combining multiple audio sources into a single output. Equalization can include adjusting the frequency response of the audio to achieve the desired tonal characteristics. Volume control can include adjusting the overall loudness of the audio.

In some embodiments, the audio processor 330 can process or configure the conversion of an audio signal from the media player 305 into uncompressed digital audio data, such as Pulse Code Modulation (PCM) data. The audio processor 330 can sample the audio signal from the media player 305, in analog form, at a specific rate (e.g., sampling rate) to determine how often per second the signal's amplitude gets measured. The audio processor 330 can quantize each sampled amplitude value into a discrete value, mapping the amplitude of each sample to the nearest value representable by a binary number. The audio processor 330 can observe the bit depth (e.g., 16-bit, 24-bit) of the system to determine the resolution of the discrete values. The audio processor 330 can encode the quantized values as PCM data, providing a direct representation of the sampled and quantized audio amplitudes in binary form, making the data storable or transmittable as digital audio.

In some embodiments, the audio processor 330 can compress the PCM data, processing it further using an audio compression algorithm (e.g., MP3, AAC) to minimize the file size for more efficient storage or transmission. The audio processor 330 can analyze the PCM data to identify and eliminate parts of the audio signal that are less perceptible to human cars. In certain embodiments, when the compressed audio file plays back, the compressed audio data first decompresses back into PCM data, which can then be converted into an analog signal by a digital-to-analog converter or a digital audio converter (DAC) and played through speakers or headphones.

The digital audio converter 335 can include any combination of hardware and software for converting digital audio data into analog electrical signals for driving speakers. The digital audio converter 335 can receive digital audio data in a format such as PCM that represents sound amplitude and frequency as discrete values stored as binary numbers. If the digital data is encoded with information such as error correction or synchronization, the digital audio converter 335 can remove the elements to extract the raw audio data. The digital audio converter 335 can decode the PCM data and translate each digital value into a corresponding voltage level in the analog domain, producing an analog signal that closely resembles the original sound wave. The digital audio converter 335 can apply filters to remove any unwanted high-frequency noise generated. Depending on the implementation, the digital audio converter 335 can amplify the analog signal to drive the speakers.

The wireless chip(s) 325 are circuitry including integrated circuits configured for wireless communication. The wireless chip 325 can include a wireless chipset. The wireless chip 325 may include any baseband processor, radio frequency transceiver, integrated circuit, chip, or chipset, or any combination thereof, and any related software used to implement wireless communication. The wireless chip 325 can transmit and receive data over a distance using radio signals. The wireless chips 325 can be configured to communicate with other wireless devices according to specific protocols (e.g., Wi-Fi, Bluetooth, cellular). The wireless chips 325 can be configured to communicate with other devices using any of the IEEE standards (e.g., IEEE 802.11 standards). The wireless chip 325 can be a System on Chip (SoC) that integrates various functionalities onto a single chip, including, but not limited to, processors (for tasks), memory (for storage), and communication interfaces (for interaction with devices), among other components.

The wireless chip(s) 325 can include any combination of hardware and software to establish a buffer pipe 312. The buffer pipe can comprise any software and/or hardware constructs, including queues, buffers, logic, circuitry, firmware or software, data channels, connections and management of any foregoing to communicate data from data buffer on one wireless chip to a data buffer on another wireless chip, such as using the I2S protocol over machine access control layer. The buffer pipe can manage the flow of audio data. In some embodiments, the wireless chip(s) 325 can communicate the audio data using the buffer pipe, thereby bypassing the transport layer stack of both the media player 305 and the wireless speaker 310. The I2S formatted data can be temporarily stored in the data buffer 340, creating or generating an audio buffer copy 345, until it is ready for transmission. The wireless chip 325 of the media player 305 can communicate the audio data (e.g., the content of the audio buffer copy 345) to the wireless chip 325 of the wireless speaker 310 via the buffer pipe, bypassing the transport layer stack.

In some embodiments, the wireless chips 325 can be configured to support network service discovery protocols. The registration process may be managed by a software layer or firmware that interacts with the wireless chips 325 for network access and registration. This configuration can enable the access point 320 to function as a bridge, facilitating communication and querying the network for devices registered via the discovery protocols. In some embodiments, the system 300A can use a separate user interface or software application (not directly on the wireless chips themselves) for manual configuration, which can be communicated to the wireless chips 325 for identification. In some embodiments, the wireless chips 325 can be configured to access pre-pairing information from a stored library. In some embodiments, the wireless chips 325 of the media player 305 and the wireless speaker 310 can be configured to identify each other as a pair using network discovery protocols, user configurations, or pre-paired information.

In some embodiments, the wireless chip(s) 325 can establish a wireless link from the media player 305 to the wireless speaker 310, bypassing any other mesh nodes on a network of the access point 320. In some embodiments, the media player 305 (e.g., via the wireless chip) can discover available connections, including scanning for Wi-Fi networks to detect nearby access points 320 or mesh nodes. Once available connections are identified, the wireless chip(s) 325 can assess factors such as signal strength to prioritize connections with stronger signals for better data transmission, distance to select the mesh node or access point 320 closest to the wireless speaker 310, network congestion to avoid heavily congested mesh nodes for smooth audio streaming, and the potential for a direct connection if the wireless speaker supports direct Wi-Fi connections and is within range. Based on the selected approach, the wireless chip(s) 325 can establish a standard Wi-Fi connection with the selected mesh node or initiate a direct Wi-Fi connection handshake with the wireless speaker 310 if both devices support it.

The I2S receiver 350 can include any combination of hardware and software for implementing I2S protocol. The I2S protocol is a standard communication method for exchanging digital audio data between integrated circuits (ICs). The I2S protocol can use a synchronous serial protocol and interface for data transmission such as for communicating digital audio data, separating the data into clock signal, channel select, and audio data packets. The I2S receiver 350 can be implemented using hardware, software, or a combination of both and can receive audio data via the I2S protocol. In some embodiments, the I2S receiver 350 can receive digital audio data in formats such as PCM (Pulse Code Modulation) from various sources within the media player 305, such as the audio processor 330, internal storage, or streaming services. PCM can be used to digitally represent analog signals. In some embodiments, the I2S receiver 350 can include a data formatter to transform or convert the input audio data into a serial format compliant with I2S standards (e.g., a serial bus standard for digital audio communication). The conversion process can include several factors, including, but not limited to, adjusting sampling rates for maintaining audio quality, modifying bit depth for higher-resolution audio, and packing the data into I2S frames.

In some embodiments, the I2S receiver 350 can adjust the sampling rates of the incoming audio data to match the receiver's operating specifications and the requirements of the I2S standard. For example, a higher or matched sampling rate can lead to better sound fidelity by more accurately representing the original signal. In some embodiments, the I2S receiver 350 can modify the bit depth of the audio data to achieve higher-resolution audio by increasing the number of bits used to represent each sample of the audio signal. For example, a higher bit depth can enable a more detailed representation of the audio signal, resulting in improved dynamic range and reduced quantization noise. The I2S receiver 350 can pack the adjusted audio data into I2S frames to organize the digital audio data into a format that is recognizable and usable by devices that comply with the I2S standard. Packing into I2S frames can include organizing the bits of data into a structured order and setting the word select signals to indicate the start of new data frames, among others.

The I2S transmitter 355 can receive the audio data in the I2S format. In some embodiments, if the audio data is transmitted in a digital format such as MP3 or AAC, the audio data can be decoded to PCM directly. The decoding process can occur in a separate component or within the I2S transmitter 355 itself, depending on the implementation. The I2S transmitter 355 can convert the audio data into a digital form, such as PCM, before sending the audio data to the digital audio converter 335. The I2S transmitter 355 can rearrange the data channels, converting them from the I2S sequence back to a format suitable for PCM processing. The I2S transmitter 355 can adjust the data word size (e.g., amount of data) to match the input requirements of the digital audio converter 335. The I2S transmitter 355 can remove synchronization signals (e.g., clock and frame synchronization) used for I2S transmission.

In some embodiments, the I2S transmitter 355 of the wireless chip 325 can receive the audio data from the buffer pipe in I2S format, which can use clocks and/or data lines for synchronized audio transmission. The I2S transmitter 355 can process the audio data for conversion. In some embodiments, the digital audio converter 335 may require a different format for conversion to analog signals. The I2S transmitter 355 can convert the audio data into a format compatible with the digital audio converter 335, such as the PCM format. The I2S transmitter 355 can transmit the converted audio data to the digital audio converter 335 via an interface, which can be a physical connection or a digital bus, depending on the implementation. In some embodiments, the I2S transmitter 355 of the wireless chip 325 can provide the audio data directly to the digital audio converter 335 for output to a speaker of the wireless speaker 310.

The data buffer 340 can include any combination of hardware and software for storing and managing data, such as audio data, for example, for an audio buffer copy 345. For example, the data buffer 340 can create or generate the audio buffer copy 345 as temporary storage to hold audio data before processing or sending it to the speakers. The audio buffer copy 345 can refer to a temporary storage location within a memory allocated for holding audio data. The audio buffer copy 345 can be a duplicate of a specific segment of the audio data stream. The data buffer 340 can include any data structures or other constructs for storing and managing data in an allocation section of memory. The data buffer 340 can include memory chips for or based on data transfer rates. For example, the data buffer 340 can move audio data quickly. In some embodiments, the data buffer 340 can use system memory for storing audio data, enabling the data buffer 340 to maintain audio data or streams. The data buffer 340 can store data temporarily to facilitate data flow from storage to processing units configured for decoding and playback (which can be in the media player or the wireless speaker, depending on the system configuration). The data buffer 340 can maintain data to provide continuous speaker operation. In some embodiments, the data buffer 340 can control data release rates to match receiver processing capabilities. For example, the data buffer 340 can adjust or modify how fast or slow audio data is sent out to match how quickly the receiver can process such data.

The wireless communication interface 360 can include any combination of hardware and software to enable communication or data exchange between devices. The wireless communication interface 360 can facilitate connectivity without physical connections, allowing devices to communicate over distances. The wireless communication interface 360 can operate by adhering to wireless protocols, such as Wi-Fi or Bluetooth, which dictate the rules and standards for communication.

In some embodiments, the wireless communication interface 360 can include a MAC (machine access control) layer 365 and a wireless radio 370. The MAC layer 365 can manage access to the wireless medium using the selected medium access control (MAC) protocol, such as over Wi-Fi or Bluetooth. The MAC layer 365 can establish rules for data transmission on the shared wireless channel to prevent collisions and maintain orderly communication. In some embodiments, the MAC layer 365 can assign addresses (e.g., MAC addresses) to devices on the network to enable data to reach its intended recipient. The MAC layer 365 can package or group data into manageable units (e.g., frames) and can add information such as sender and receiver addresses or error-checking codes.

In some embodiments, the wireless chip(s) 325 can be configured to communicate audio data via the MAC layer 365, such as using the I2S protocol. For example, the wireless chip(s) 325 can encapsulate the audio data within network packets by adding header information that includes source and destination addresses, routing instructions, and other control data. The MAC layer 365 can manage network access and/or facilitate communication between devices. The MAC layer 365 can take the prepared audio data packets and transmit them through the wireless communication interface 360, using standard network protocols such as Wi-Fi or Bluetooth. In some embodiments, the MAC layer 365 can perform tasks, such as channel selection (e.g., based on available channels, signal strength, etc.), collision avoidance (e.g., via carrier sense multiple access with collision avoidance (CSMA/CA)), or packet forwarding (e.g., based on their MAC addresses). The wireless chip(s) 325 can receive the audio data packets through its wireless communication interface 360, where the MAC layer 365 on the wireless chip 325 can extract the audio data from the packets and remove the header information. The received audio data can undergo further processing before being sent for playback.

In some embodiments, the wireless radio system 370 can transform or convert digital data (e.g., audio or video data) into radio signals or waves at frequencies, such as frequencies determined by the selected wireless protocol (e.g., Wi-Fi, Bluetooth). The wireless radio system 370 can transmit data-carrying radio waves and can receive incoming signals from other devices. In some embodiments, the wireless radio system 370 can amplify the outgoing signals for effective transmission and can attenuate (e.g., reduce the strength or intensity) the incoming signals for improved or desired processing.

The access point 320 can include a device or module (including a combination of hardware and software) that allows wireless communication devices to connect to a wired network using wireless fidelity (Wi-Fi), or other standards. The access point 320 can sometimes be referred to as a wireless access point (WAP). The access point 320 can be implemented (e.g., configured, designed, and/or built) for operating in a wireless local area network (WLAN). The access point 320 can connect to a router (e.g., via a wired network) as a standalone device in some embodiments. In some embodiments, the access point 320 can be a component of a router. The access point 320 can provide multiple devices with access to a network 2064. The access point 320 can, for example, connect to a wired Ethernet connection and provide wireless connections using radio frequency links for other devices to utilize that wired connection. The access point 320 can be implemented to support a standard for sending and receiving data using one or more radio frequencies. Those standards, and the frequencies they use can be defined by the IEEE (e.g., IEEE 802.11 standards). The access point 320 can be configured and/or used to support Internet hotspots, and/or on a network to extend the network's Wi-Fi signal range. In some embodiments, the access point 320 can facilitate a connection between the media player 305 and the wireless speaker 310. For example, the wireless chip 325 of the media player 305 and the wireless chip 325 of the wireless speaker 310 can communicate through the access point 320. The access point 320 can receive data packets from the media player 305 and forward the data packets to the wireless speaker 310.

The latency controller 385 can include any combination of hardware and software for identifying, managing and controlling the latency between the media player 305 and the wireless speaker 310. In some embodiments, the latency control 385 is within the access point. In other embodiments, the access point communicates with a latency server, such as the latency server 1005 in FIGS. 1A-IF that acts as the latency controller. The latency controller 385 can manage and/or prioritize the audio data and transmit the prioritized audio data through certain data pipes or channels, such as the constant bit rate pipe 375 and the high priority data pipe 380. The latency controller 385 can use pre-defined markers or protocols to identify audio data packets. The latency controller 385 can identify audio packets based on tuple information of the packets. The latency controller 385 can identify audio packets based on header information and/or content of the packets carrying audio data. The latency controller 385 can establish or maintain a queue (e.g., a high priority queue) for the identified audio data. The audio data can be forwarded before other types of data, such as lower priority content. In some embodiments, the latency controller 385 can dynamically identify network conditions, congestion levels, and audio content characteristics to adjust or modify the priority of different packets carrying audio (sometimes referred to as audio packets) or different flows of packets carrying audio.

In some embodiments, the system 300A can establish the constant bit rate pipe 375 between the media player 305 and the access point 320, such as by circuitry, software, application, service process, library, function, or set of executable instructions on the media player device and/or the access point. A constant bit rate (CBR) can provide a consistent or steady transmission or data flow rate, for example, over a network or connection, regardless of network fluctuations. A pipe for the CBR or CBR pipe 375 can comprise any software and/or hardware constructs, including queues, buffers, logic, circuitry, firmware or software, data channels, connections and management of any foregoing to provide a constant bit rate of a flow of data or transmission of data between two points, such as two devices, for example the access point to a media player device or the wireless speaker. The wireless chip(s) 325 can communicate audio data (e.g., PCM audio data) from the media player 305 via the constant bit rate pipe 375 to the access point 415. The access point 320 can establish, maintain and/or reserve a data channel for the CBR pipe to the media player device and for audio transmission from the access point to the wireless speaker 310, such as for providing a specific bandwidth or network availability to maintain a consistent or steady data rate for audio data flow.

In some embodiments, the system 300A can establish the high priority data pipe 380 between the access point 320 and the wireless speaker 310 such as by circuitry, software, application, service process, library, function, or set of executable instructions on the wireless speaker and/or the access point. The high priority data pipe can comprise any software and/or hardware constructs, including queues, buffers, logic, circuitry, firmware or software, data channels, connections and management of any foregoing to provide and prioritize at a higher priority a data flow between the media player and access point. The high priority data pipe may be implemented on the WiFi Chip and/or media player and/or access point. The media player and/or WiFi chip may store audio data for transmission to the WiFi speaker in one or more queues identified as higher priority (e.g., high priority) that other data on the media player and/or WiFi chip that is to be transmitted. The data buffer 340 may be part of, form or implement the high priority queue for the high priority data pipe. The firmware, software and/or logic of the WiFi chip may transmit audio data from these high priority queues for transmission to the access point. Such transmission of audio data packets or frames may be identified with priority field or signal to indicate to access point the higher priority quality of service for transmission to the WiFi Speaker. The access point may store such audio data in a high or higher priority queue of the access point for transmission to the WiFi Speaker, such as to prioritize the audio data over transmission of other data traversing the access point. For example, the access point can transmit PCM audio data from the access point 415 to the wireless speaker 310 via the high priority data pipe 380. The access point 320 can have queues for different types of traffic, and the latency controller 385 can configure the access point 320 to prioritize the audio data from the media player 305 by placing such audio data in a high-priority queue such that audio packets get transmitted before other types of data, such as web browsing or downloads.

In some embodiments, the media player 305, the wireless speaker 310, and the access point 320 can each be configured to dynamically disable or enable data aggregation. For example, if the application is identified as a low latency application, such as for music streaming or gaming, the data aggregation can be disabled. In some embodiments, the server 1005, as described in connection with FIGS. 1A-IF, or a low latency application detector, can identify characteristics indicative of low latency applications. In some embodiments, the media player 305, the wireless speaker 310, and the access point 320 can each be configured to identify low latency applications.

Upon detecting a low latency application, the system 300A (e.g., via the wireless chips(s) 325) can dynamically disable the data aggregation. In some embodiments, the wireless chip 325 of the media player 305 can disable packet aggregation, avoiding the combination of multiple audio data packets into larger chunks before transmitting them. The wireless chip 325 of the media player 305 can adjust or modify its internal buffering to send data closer to real-time, reducing the delay caused by buffering large amounts of data before transmission. In some embodiments, the latency controller 385 of the access point 320 can disable frame aggregation, avoiding the combination of multiple data frames from different sources before transmitting them. In some embodiments, the latency controller 385 of the access point 320 can prioritize audio data packets over other network traffic. In some embodiments, the wireless chip 325 of the wireless speaker 310 can disable packet aggregation, reducing the time to convert data into sound and minimizing the delay between receiving and playing audio. In some embodiments, the wireless chip 325 of the wireless speaker 310 can adjust its buffering to process audio data closer to real-time, reducing the delay caused by buffering data before playback.

Figure 3B:
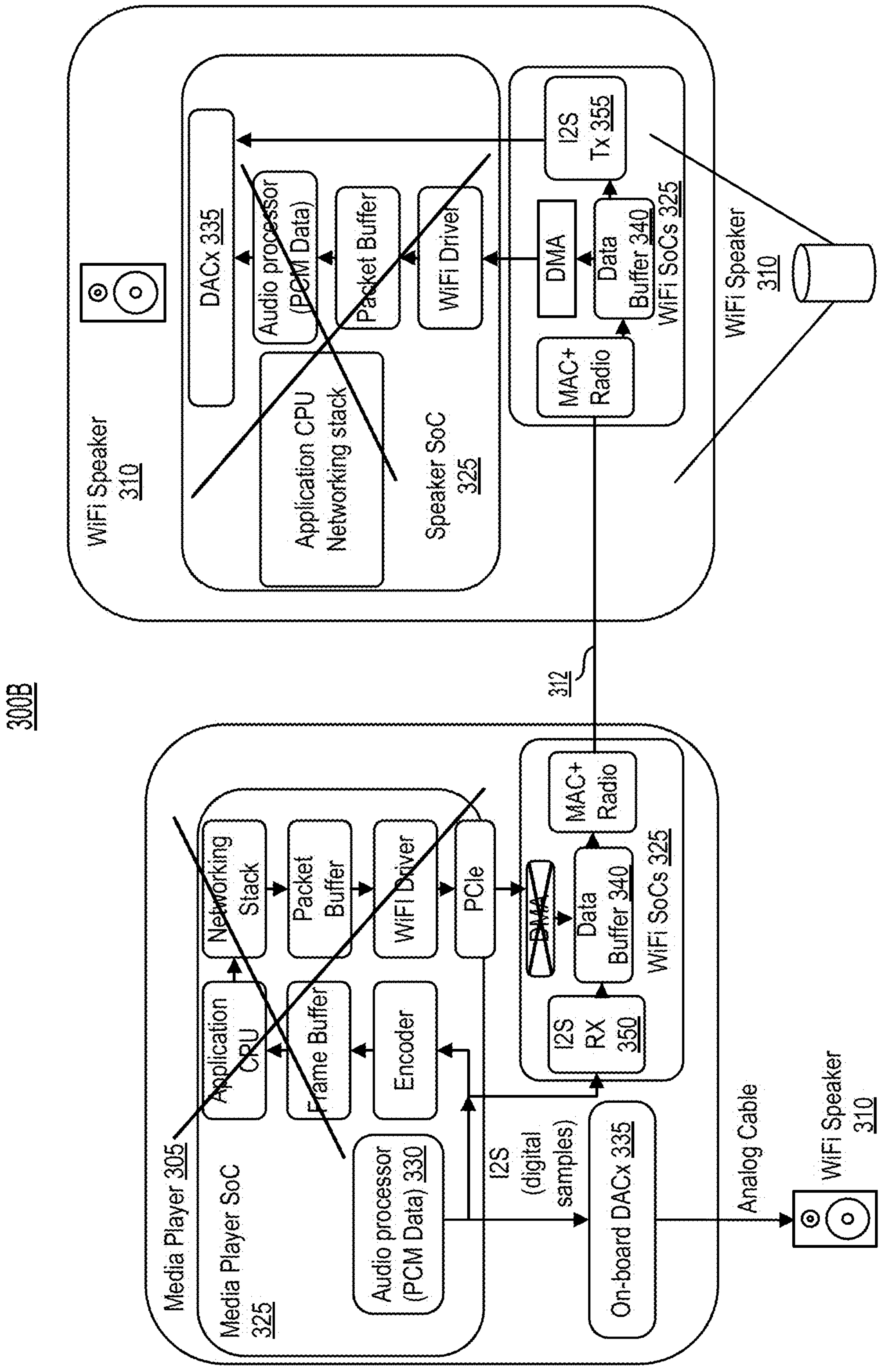
FIG. 3B illustrates a block diagram of an example system for reducing latency for audio streaming between a media player and a wireless speaker, in accordance with one or more embodiments.

Referring now to FIG. 3B, depicted is a system 300B depicting how the system 300A of FIG. 3A bypasses the network stack or portions thereof to reduce latency. For example, the system 300A bypasses the application CPU, networking stack, frame buffer, packet buffer, Wi-Fi drivers, peripheral component interconnect express (PCIe) interfaces, direct memory access (DMA), and encoders, all of which are identified as crossed out and not used in the implementation of 300A. The aforementioned system components can be used for network communication protocols but may introduce unnecessary overhead for low latency audio streaming.

As described in connection with FIG. 3A, from the audio processor 330, the audio data in PCM format can bypass several components involved in network communication. For example, the configuration described in FIG. 3B can avoid using the encoder to convert the audio data to a compressed format for network transmission. The frame buffer can be considered unnecessary for temporarily storing audio data for network packet creation. The application CPU can remain unburdened with processing the audio data for network transmission. The networking stack, with its complex protocols and routing functionalities, can be bypassed entirely or at least portions thereof. The Wi-Fi driver, responsible for managing Wi-Fi communication protocols, can be excluded from this initial stage. Additionally, PCIe and DMA interfaces, usually desired for data transfer, can be unnecessary for this configured path of the system of 300A.

As described in FIG. 3A, instead of routing through the network stack, the audio data can take a direct path to the I2S receiver 350, as shown in FIG. 3B. The I2S receiver 350 within the Wi-Fi wireless chip 325 can receive digital audio data in formats such as PCM from various sources within the media player 305, such as the audio processor 330, internal storage, or streaming services. In some embodiments, the data buffer 340 can be used for generating the audio buffer copy 345 as a temporary storage to hold audio data before transmission, bypassing the network stack. The data buffer 340 can operate within the Wi-Fi wireless chip 325, bypassing the network stack. In some embodiments, the media player 305 can include a built-in digital audio converter 335 that can convert digital audio data into an analog signal suitable for driving a speaker directly through a standard analog cable.

The wireless communication interface 360 within the Wi-Fi wireless chip 325 are configured to enable communication or data exchange between devices, such as via the MAC layer, for transmission of audio data between media player and WiFi speaker.

FIG. 3B illustrates the Wi-Fi speaker's audio processing path. For example, the Wi-Fi wireless chip 325 of the Wi-Fi speaker 310, as described in connection with FIG. 3A, can receive the audio data via the wireless communication interface 360 and transmit the audio data to the data buffer 340 and subsequently to the I2S transmitter 355. The I2S transmitter 355 can convert the audio data into a digital form, such as PCM, before the audio data can be sent to the digital audio converter 335. The digital audio converter 335 can convert the digital audio data into analog signals to drive the speaker of the Wi-Fi device, bypassing several stages of audio data handling. For example, the configuration can avoid sending audio data from the data buffer to the DMA and then to the Wi-Fi driver. Additionally, the configuration can eliminate the desire to send the audio data to a packet buffer and then to the audio processor for PCM data conversion before reaching the digital audio converter 335.

Figure 4:
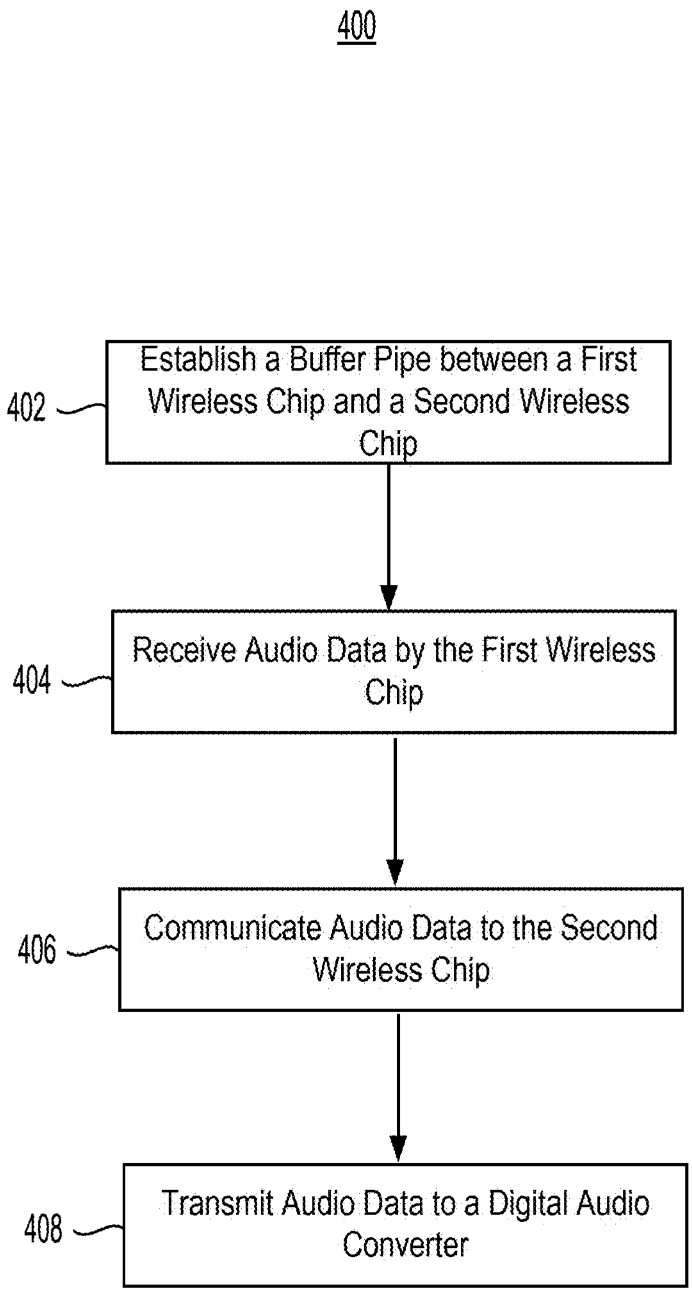
FIG. 4 illustrates an example flow diagram of a method for improving latency for wireless speakers, in accordance with one or more embodiments.

FIG. 4 illustrates a method 400 of improving latency for wireless speakers. The method 400 can be implemented using a system 100, 200, 300A, and 300B, or any other features discussed in FIGS. 1-3. The method can include acts 402-408. At 402, a first wireless chip of a media player in wireless communication with a second wireless chip of a wireless speaker can establish a buffer pipe. At 404, the first wireless chip of the media player can receive samples of audio data. At 406, the first wireless chip of the media player can communicate the audio data to the second wireless chip of the wireless speaker. At 408, the second wireless chip of the wireless speaker can transmit the audio data directly to a digital audio converter.

At 402, a first wireless chip of a media player in wireless communication (e.g., via an access point or a wireless network) with a second wireless chip of a wireless speaker can establish a buffer pipe 312. The first wireless chip and the second wireless chip establish the buffer pipe using the I2S protocol to communicate audio data. The first wireless chip and the second wireless chip may communicate using the I2S protocol over the MAC layer using WiFi based communications. The first wireless chip and the second wireless chip may each establish one or more data buffer for receiving, storing, and communicating audio data between the devices.

The wireless chip of the media player can initiate a connection with the wireless chip of the wireless speaker through standard wireless protocols such as Bluetooth or Wi-Fi. The wireless chip(s) can be configured to negotiate their capabilities and agree to establish a buffer pipe using a protocol, which might be proprietary or standardized. The wireless chip of the media player can allocate buffer space in its memory for storing audio data, acting as a temporary holding area before sending it to the wireless speaker. The wireless chip of the media player can send or transmit audio data packets to the wireless speaker's data buffer, with the data flow controlled by the agreed-upon protocol. The wireless chip of the wireless speaker can process the audio data from the buffer copy and play it back through its audio processing and drivers. The use of a buffer pipe can reduce latency, minimizing the delay between data transmission and playback for smoother audio. The wireless chip of the wireless speaker can be configured to power down its radio more frequently when data is available in the buffer, saving battery life. The example can expand to include dynamic buffer size adjustment based on network conditions, speaker capabilities, and audio content, incorporate error correction mechanisms to ensure data integrity during transmission, and extend the buffer pipe to manage or configure multichannel audio formats for surround sound experiences.

At 404, an I2S receiver within the wireless chip of the media player can receive samples of audio data. The wireless chip of the media player can process (e.g., via the audio processor) the conversion of an audio signal from the media player into uncompressed digital audio data, such as PCM data. The I2S receiver can receive digital audio data in PCM format. The I2S receiver can adjust the sampling rates of the incoming audio data to match the receiver's operating specifications and the requirements of the I2S standard. For example, a higher or matched sampling rate can lead to better sound fidelity by more accurately representing the original signal. The I2S receiver can modify the bit depth of the audio data to achieve higher-resolution audio by increasing the number of bits used to represent each sample of the audio signal. For example, a higher bit depth can enable a more detailed representation of the audio signal, resulting in improved dynamic range and reduced quantization noise. The I2S receiver can pack the adjusted audio data into I2S frames to organize the digital audio data into a format that is recognizable and usable by devices that comply with the I2S standard. The I2S receiver can store audio data received and processed to the data buffer for transmission.

At 406, the wireless chip of the media player can communicate the audio data from the data buffer to the wireless chip of the wireless speaker. The wireless chip of the media player may communicate the audio data to the access point via the constant bit rate data pipe. The access point may communicate the audio data to the wireless speaker via the high priority data pipe. As such, the buffer pipe between the media player and WiFi speaker may be communicated via the constant bit rate pipe to the access point and via the high priority data pipe to the WiFi Speaker.

The wireless chip of the wireless speaker can receive the incoming audio data via the wireless communication interface. The wireless chip of the wireless speaker can include an I2S transmitter that can receive audio data (e.g., from the data buffer). The audio data can be in the I2S format. The I2S transmitter of the wireless speaker can convert the audio data into a digital form, such as PCM, before sending the audio data to the digital audio converter. The I2S transmitter can adjust the data word size to match the input requirements of the digital audio converter. In some embodiments, the I2S transmitter can remove synchronization signals used for I2S transmission. In some embodiments, the I2S transmitter can rearrange the data channels, converting them from the I2S sequence back to a format suitable for PCM processing. In some embodiments, if the audio data within the system is transmitted in a digital format such as MP3 or AAC, the audio data can be decoded to PCM directly.

At 408, the I2S transmitter within the wireless chip of the wireless speaker can provide the audio data to the digital audio converter (DAC), such as directly to the DAC. The digital audio converter can receive digital audio data in a format such as PCM that represents sound amplitude and frequency as discrete values stored as binary numbers. If the digital data is encoded with information such as error correction or synchronization, the digital audio converter can remove the elements to extract the raw audio data. The digital audio converter can decode the PCM data and translate each digital value into a corresponding voltage level in the analog domain, producing an analog signal that closely resembles the original sound wave. The digital audio converter can apply filters to remove any unwanted high-frequency noise generated. Depending on the implementation, the digital audio converter can amplify the analog signal to drive the speakers.

Figure 5:
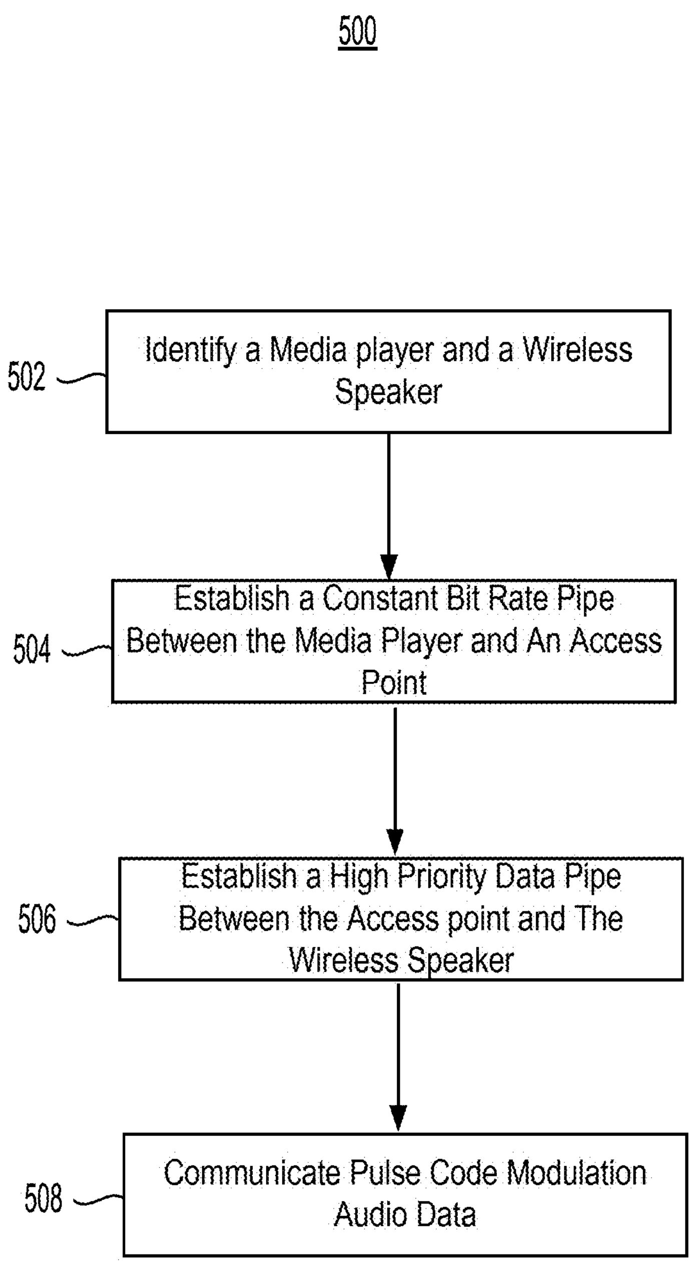
FIG. 5 illustrates an example flow diagram of a method for providing audio streaming, in accordance with one or more embodiments.

FIG. 5 illustrates a method 500 of providing audio streaming. The method 500 can be implemented using a system 100, 200, 300A, and 300B, or any other features discussed in FIGS. 1-3. The method 500 can include acts 502-508. At 502, the wireless chip(s) can be configured to identify a media player and a wireless speaker for which to provide a low latency data pipe. At 504, the access point can be configured (e.g., via the network controller) to establish a constant bit rate pipe between the media player and the access point. At 506, the access point can be configured (e.g., via the network controller) to establish a high priority data pipe between the access point and the wireless speaker. At 508, the wireless chip of the media player can communicate pulse code modulation audio data via the data pipes to the wireless chip of the wireless speaker.

At 502, the wireless chips of the media player and the wireless speaker can identify each other to establish a connections and communications, such as through an access point. The wireless chip(s) can use network discovery protocols such as mDNS or DLNA to broadcast their presence and pairing details. The wireless chip(s) can be manually configured with names or identifiers to set up direct pairing. The wireless chip(s) can have pre-paired identifiers embedded in their firmware.

The access point can facilitate the wireless connectivity between the wireless chips. The access point can have wireless network interfaces that can transmit and receive radio signals according to protocols such as Wi-Fi, Bluetooth, etc. In some embodiments, the wireless chip of the media player and the wireless chip of the speaker can be configured to connect to the access point, which can include manually selecting the network and entering the password or using automatic configuration protocols such as Wi-Fi Protected Setup (WPS). Once connected, the wireless chip of the media player and the wireless chip of the wireless speaker can exchange data through the access point. The access point can receive data packets from the media player and forward the data packets to the wireless speaker.

In some embodiments, the wireless chip(s) can establish a wireless link from the media player to the wireless speaker, bypassing any other mesh nodes on a network of the access point. In some embodiments, the media player (e.g., via the wireless chip) can discover available connections, including scanning for Wi-Fi networks to detect nearby access points or mesh nodes. Once available connections are identified, the wireless chip(s) can assess factors such as signal strength to prioritize connections with stronger signals for better data transmission, distance to select the mesh node or access point closest to the wireless speaker, network congestion to avoid heavily congested mesh nodes for smooth audio streaming, and the potential for a direct connection if the wireless speaker supports direct Wi-Fi connections and is within range. Based on the selected approach, the wireless chip(s) can establish a standard Wi-Fi connection with the selected mesh node or initiate a direct Wi-Fi connection handshake with the wireless speaker if both devices support it.

At 504, the access point can be configured (e.g., via the network controller) to establish a constant bit rate pipe between the media player and the access point. The wireless chip of the media player can communicate uncompressed audio data, such as PCM audio data, via the constant bit rate pipe to the access point. The access point can be configured (e.g., via the hardware support or the use of protocols) to provide a specific bandwidth to maintain a consistent data rate for audio data flow. In some embodiments, the access point can use the Resource Reservation Protocol (RSVP) to reserve a minimum amount of bandwidth for audio data flow across the network through RSVP messages. In some embodiments, users or manufacturers can use proprietary protocols to establish constant bit rate connections for audio streaming.

At 506, the access point can be configured, such as by the latency controller or otherwise, to establish the high priority data pipe between the access point and the wireless speaker. The access point can communicate PCM audio data to the wireless chip of the wireless speaker via the high priority data pipe. The access point can be configured to have queues for different types of traffic, and the access point can prioritize (e.g., via the latency controller) the audio data received from the wireless chip of the media player by placing the audio data in a high-priority queue such that the audio data packets get transmitted before other types of data, such as web browsing or downloads. In some embodiments, where the access point supports quality of service (QOS) protocols, the access point can be configured to predefine QoS markings for the audio data packets. The predefined QoS markings can indicate the importance of the relevant audio data packets and cause the access point to prioritize the transmission accordingly.

At 508, the wireless chip of the media player can communicate PCM audio data via the data pipes to the wireless speaker. The wireless chip of the media player can transmit the audio data packets via the constant bit rate pipe to the access point. The constant bit rate pipe can provide a consistent bit rate for stable data transmission. The access point can receive the audio data packets from the constant bit rate pipe and can prioritize the audio data packets (e.g., via the latency controller) in the high-priority data pipe compared to other network traffic. The access point can forward the prioritized audio packets to the wireless chip of the wireless speaker. The wireless chip of the wireless speaker can receive the prioritized audio data packets from the access point, extract the PCM audio data from the audio data packets, and convert the digital data back into analog audio signals for playback.

In some embodiments, the wireless chip(s) can dynamically disable or enable data aggregation. For example, the wireless chip(s), the access point, or the server can identify an application as a low latency application, such as for music streaming or gaming. Upon detecting the low latency application, the wireless chip(s) can dynamically disable data aggregation. For example, the wireless chip of the media player can disable packet aggregation, avoiding the combination of multiple audio data packets into larger chunks before transmitting them. The wireless chip of the wireless speaker can disable packet aggregation, reducing the time to convert audio data into sound and minimizing the delay between receiving and playing audio.

It should be noted that certain passages of this disclosure may reference terms such as “first” and “second” in connection with devices, modes of operation, transmit chains, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment. The terms coupled or connected include indirect and direct couplings and connections.

While the disclosure has been described with respect to specific embodiments, one skilled in the art will recognize that numerous modifications are possible. For instance, although specific examples of rules (including triggering conditions and/or resulting actions) and processes for generating suggested rules are described, other rules and processes can be implemented. Embodiments of the disclosure can be realized using a variety of computer systems and communication technologies including but not limited to specific examples described herein.

Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in a certain order, the ordering of certain events can be modified. Additionally, certain of the events can be performed repeatedly, concurrently in a parallel process when possible, as well as performed sequentially as described above. Furthermore, certain embodiments can omit one or more described events.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field-programmable gate array (FPGA), and/or an application-specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and software development tools. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method comprising:

establishing a buffer pipe between a first wireless chip of a media player and a second wireless chip of a wireless speaker using an Inter-IC Sound (I2S) protocol, the wireless speaker in wireless communication with the media player;

receiving, by a receiver of the first wireless chip of the media player, samples of audio data; and communicating, by the first wireless chip, the audio data to the second wireless chip using the buffer pipe to bypass a transport layer stack of the media player and the wireless speaker, and a transmitter of the second wireless chip providing the audio data directly to a digital audio converter for output to a speaker of the wireless speaker.

2. The method of claim 1, further comprising communicating pulse code modulation (PCM) audio data from the first wireless chip to the second wireless chip via the Inter-IC Sound (I2S) protocol.

3. The method of claim 1, further comprising communicating, by the first wireless chip to the second wireless chip the audio data via a machine access control (MAC) layer of a network stack.

4. The method of claim 1, further comprising communicating, by the first wireless chip to the second wireless chip the audio data via a buffer copy of the audio data from a first buffer of the first wireless chip to a second buffer of the second wireless chip.

5. The method of claim 1, wherein the wireless speaker is in communication with the media player via an access point.

6. The method of claim 1, wherein the media player comprises at least one of a set-top box, a television, a home theater system, or an over the top (OTT) device.

7. The method of claim 1, further comprising receiving, by the receiver, samples of audio data from output of an audio processor of the media player, wherein the receiver comprises an I2S receiver.

8. The method of claim 1, further comprising receiving, by the transmitter, the audio data from a buffer of the second wireless chip, wherein the transmitter comprises an I2S transmitter.

9. A system comprising:

a first wireless chip of a media player in wireless communication with a second wireless chip of a wireless speaker;

wherein the first wireless chip and the second wireless chip are configured to establish a buffer pipe to transfer audio data using an Inter-IC Sound (12S) protocol;

wherein an I2S receiver of the first wireless chip of the media player is configured to receive samples of audio data; and communicate, the audio data to the second wireless chip using the buffer pipe to bypass a transport layer stack of the media player and the wireless speaker; and wherein an I2S transmitter of the second wireless chip provides the audio data directly to a digital audio converter for output to a speaker of the wireless speaker.

10. The system of claim 9, wherein the I2S receiver is further configured to communicate pulse code modulation (PCM) audio data from the first wireless chip to the second wireless chip via the Inter-IC Sound (12S) protocol.

11. The system of claim 9, wherein the first wireless chip is further configured to communicate to the second wireless chip the audio data via a machine access control (MAC) layer of a network stack.

12. The system of claim 9, wherein first wireless chip is further configured to communicate to the second wireless chip the audio data via a buffer copy of the audio data from a first buffer of the first wireless chip to a second buffer of the second wireless chip.

13. The system of claim 9, wherein the media player comprises at least one of a set-top box, a television, a home theater system, or an over the top (OTT) device.

14. The system of claim 9, wherein the I2S receiver is further configured to receive the samples of audio data from output of an audio processor of the media player.

15. A method comprising:

identifying, by a first wireless chip of a media player, a second wireless chip of a wireless speaker via a network discovery protocol;

establishing, between the first wireless chip and the second wireless chip, a buffer pipe using an Inter-IC Sound (I2S) protocol over a machine access control (MAC) layer, the buffer pipe bypassing a transport layer stack of the media player and the wireless speaker;

receiving, by an I2S receiver of the first wireless chip, samples of audio data in pulse code modulation (PCM) format;

storing, in a data buffer of the first wireless chip, the samples of audio data;

communicating, by the first wireless chip of the media player, the samples of audio data from the data buffer to an I2S transmitter of the second wireless chip; and providing, by the 12S transmitter of the second wireless chip, the samples of audio data to a digital audio converter of the wireless speaker for conversion into analog audio signals for the wireless speaker.

16. The method of claim 15, further comprising generating, by the first wireless chip of the media player, an audio buffer copy of the samples of audio data.

17. The method of claim 15, further comprising disabling, by the first wireless chip of the media player, packet aggregation for the samples of audio data.

18. The method of claim 15, further comprising adjusting, by the I2S receiver of the first wireless chip of the media player, a sampling rate of the samples of audio data.

19. The method of claim 15, further comprising modifying, by the I2S receiver of the first wireless chip of the media player, a bit depth of the samples of audio data.

20. The method of claim 15, further comprising filtering, by the digital audio converter of the wireless speaker, the analog audio signals to remove high-frequency noise.

* * * * *